(12) United States Patent
Kikuchi

(10) Patent No.: US 12,524,870 B2
(45) Date of Patent: Jan. 13, 2026

(54) BAR ARRANGEMENT INSPECTION SYSTEM AND BAR ARRANGEMENT INSPECTION METHOD

(71) Applicant: TOPCON CORPORATION, Tokyo (JP)

(72) Inventor: Takeshi Kikuchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 86 days.

(21) Appl. No.: 18/474,806

(22) Filed: Sep. 26, 2023

(65) Prior Publication Data

US 2024/0112327 A1 Apr. 4, 2024

(30) Foreign Application Priority Data

Sep. 30, 2022 (JP) ................................. 2022-159149

(51) Int. Cl.
*G06T 7/00* (2017.01)
*G01S 7/481* (2006.01)
(Continued)

(52) U.S. Cl.
CPC ............ *G06T 7/001* (2013.01); *G01S 7/4817* (2013.01); *G01S 17/86* (2020.01); *G01S 17/89* (2013.01);
(Continued)

(58) Field of Classification Search
CPC ............... B60R 11/04; B60R 19/483; B60R 2011/0087; B60R 2011/0026; B60R 11/00; B60R 19/52; B60R 21/013; B60R 2011/0042; G01D 11/30; G06T 7/001; G06T 7/0006; G06T 2207/10028; G06T 2207/20081; G06T 2207/30108;
(Continued)

(56) References Cited

U.S. PATENT DOCUMENTS

| 10,282,591 | B2 * | 5/2019 | Lindner | ................. G01S 17/89 |
| 2018/0063510 | A1 * | 3/2018 | Wolke | ....................... G06T 5/20 |
| 2019/0033074 | A1 * | 1/2019 | Ikeda | ..................... G01B 11/14 |

FOREIGN PATENT DOCUMENTS

JP 2020-027058 A 2/2020

* cited by examiner

*Primary Examiner* — Michael E Teitelbaum
(74) *Attorney, Agent, or Firm* — Studebaker Brackett PLLC

(57) ABSTRACT

A bar arrangement inspection system includes a scanner for acquiring three-dimensional point cloud data of an inspection range, a camera for acquiring image data of the inspection range, a processor, and three-dimensional bar arrangement design data of the inspection range, the processor is configured to receive the three-dimensional point cloud data of the inspection range from the scanner and the image data of the inspection range from the camera, generate a point cloud composite image by combining the three-dimensional point cloud data with the image data, identify a bar arrangement state and positions of reinforcing bars included in the point cloud composite image, and by comparing the point cloud composite image with the three-dimensional bar arrangement design data, generate three-dimensional bar arrangement state inspection result data, and output the bar arrangement state inspection result data in such a manner that the bar arrangement error is visually identifiable.

8 Claims, 17 Drawing Sheets

(51) Int. Cl.
*G01S 17/86* (2020.01)
*G01S 17/89* (2020.01)

(52) U.S. Cl.
CPC .. G06T 7/0006 (2013.01); *G06T 2207/10028* (2013.01); *G06T 2207/20081* (2013.01); *G06T 2207/30108* (2013.01)

(58) Field of Classification Search
CPC ......... G06T 2207/20084; G01S 7/4817; G01S 17/86; G01S 17/89; G01S 17/10
See application file for complete search history.

BAR ARRANGEMENT INSPECTION SYSTEM AND BAR ARRANGEMENT INSPECTION METHOD

CROSS-REFERENCE TO RELATED APPLICATION, BENEFIT CLAIM, AND INCORPORATION BY REFERENCE

The present application claims priority under 35 U.S.C. § 119 to Japanese Patent Application No. 2022-159149 filed Sep. 30, 2022. The contents of this application are incorporated herein by reference in their entirely.

TECHNICAL FIELD

The present invention relates to a bar arrangement inspection system, and more specifically, to a bar arrangement inspection system using a three-dimensional laser scanner.

BACKGROUND

In a bar arrangement inspection in reinforcing bar construction, whether the types, the numbers, positions, pitches (intervals), and joining means, etc., of reinforcing bars are correctly arranged as designed is inspected. Conventionally, an inspector had to inspect whether there was any error by checking a bar arrangement state at the site against a bar arrangement drawing, and image and record the state with a digital camera, etc., and this was very troublesome.

Therefore, in recent years, a technique of acquiring bar arrangement information including the numbers, diameters, and pitches, etc., of reinforcing bars by using shot images has been proposed (refer to, for example, Patent Literature 1).

CITATION LIST

Patent Literature

Patent Literature 1: Japanese Published Unexamined Patent Application No. 2020-27058

SUMMARY OF INVENTION

Technical Problem

However, with a bar arrangement inspection system described in Patent Literature 1, each time an image is shot, a ruler and a marker for imparting reference data to be used as references of the reinforcing bar length and thickness must be set, and this was troublesome.

The present invention was made in view of these circumstances, and an object thereof is to provide a bar arrangement inspection system that eases the burden on a worker when conducting a bar arrangement inspection.

Solution to Problem

In order to achieve the object described above, a bar arrangement inspection system according to an aspect of the present invention has the following configuration:

1. A bar arrangement inspection system including at least one scanner configured to acquire three-dimensional point cloud data of an inspection range by transmitting scanning light and receiving reflected light in a state where coordinates and a direction of the scanner are known, at least one camera configured to acquire image data of the inspection range in a state where coordinates and a direction of the camera are known, at least one processor capable of transmitting and receiving information to and from the camera and the scanner, and three-dimensional bar arrangement design data of the inspection range, wherein the processor is configured to receive the three-dimensional point cloud data of the inspection range acquired by the scanner and the image data of the inspection range shot by the camera, generate a point cloud composite image by combining the three-dimensional point cloud data with the image data, identify a bar arrangement state and positions of reinforcing bars included in the point cloud composite image, and by comparing the point cloud composite image with the three-dimensional bar arrangement design data, generate three-dimensional bar arrangement state inspection result data including a bar arrangement error and position information of the bar arrangement error, and output the bar arrangement state inspection result data as output data in which the bar arrangement error is visually identifiable.

2. In the aspect described in 1 above, it is also preferable that a bar arrangement state and positions of reinforcing bars included in the point cloud composite image are identified by using a bar arrangement state identification model obtained as a result of learning a large number of point cloud composite images for learning created for various bar arrangement states.

3. In the aspect described in 1 or 2 above, it is also preferable that the camera includes a display, a relative position sensor, and a relative direction sensor, and is equipped in an eyewear device configured to be capable of transmitting and receiving information to and from the processor, and configured so that information on positions and directions is synchronously managed in a common coordinate space with the scanner and the three-dimensional bar arrangement design data, and the bar arrangement state inspection result data is displayed on the display by being superimposed on actual objects in the inspection range.

4. In the aspect described in any of 1 to 3 above, it is also preferable that the processor determines whether the three-dimensional bar arrangement design data conforms to standard specifications, and when the three-dimensional bar arrangement design data does not conform to the standard specifications, corrects the three-dimensional bar arrangement design data so as to conform to the standard specifications.

5. In the aspect described in any of 1 to 4 above, it is also preferable that the scanner acquires the three-dimensional point cloud data of the inspection range, the camera acquires image data of a partial range set in the inspection range, and the processor generates a point cloud composite image by combining the three-dimensional point cloud data corresponding to the partial range with image data of the partial range.

6. In the aspect described in 2 and 3 to 5 depending on 2 above, it is also preferable that the scanner acquires the three-dimensional point cloud data of the entire inspection range, the camera shoots an image of a region of the entire inspection range, and the processor generates the point cloud composite image by combining the three-dimensional point cloud data with the image, extracts an inspection object range from the point cloud composite image, sections the inspection object range, and input each section to the bar arrangement state identification model.

Further, a bar arrangement inspection method according to another aspect of the present invention includes a step of acquiring three-dimensional point cloud data of an inspection range by at least one scanner configured to acquire three-dimensional point cloud data by transmitting scanning light and receiving reflected light in a state where coordinates and a direction of the scanner are known, a step of acquiring image data of the inspection range by at least one camera in a state where coordinates and a direction of the camera are known, a step of generating a point cloud composite image by combining the three-dimensional point cloud data of the inspection range acquired by the scanner with the image data shot by the camera by receiving the three-dimensional point cloud data and the image data of the inspection range by at least one processor and at least one memory, and a step of generating three-dimensional bar arrangement state inspection result data including a bar arrangement error and position information of the bar arrangement error by identifying a bar arrangement state and positions of reinforcing bars included in the point cloud composite image and comparing the point cloud composite image with three-dimensional bar arrangement design data by the processor, wherein the processor outputs the bar arrangement state inspection result data as output data in which the bar arrangement error is visually identifiable.

Benefit of Invention

According to the aspects described above, the burden on a worker when conducting a bar arrangement inspection can be eased.

DESCRIPTION OF EMBODIMENTS

Hereinafter, preferred embodiments of the present invention will be described with reference to the drawings, however, the present invention is not limited thereto. The same configurations common to the embodiments and modification are provided with the same reference signs, and overlapping descriptions thereof are omitted as appropriate.

I. First Embodiment

1. Configuration of Bar Arrangement Inspection System 100

Figure 1:
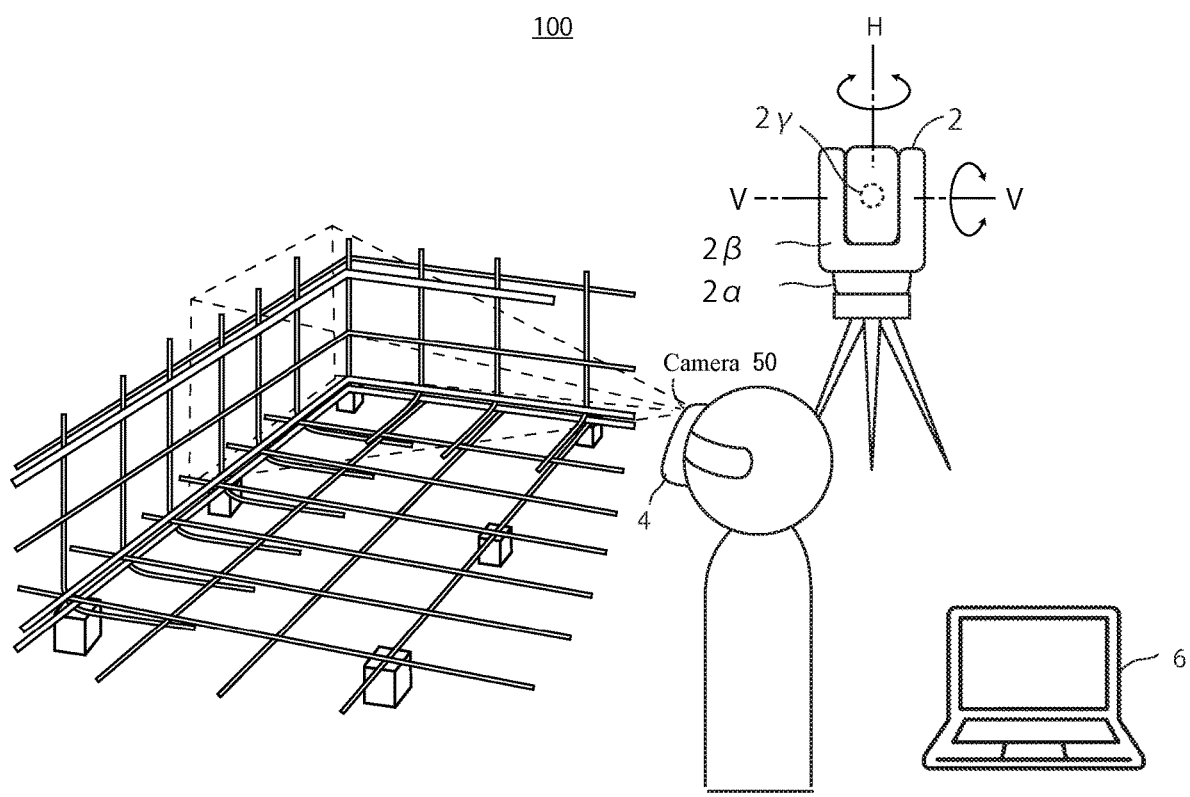
FIG. 1 is an external schematic view of a bar arrangement inspection system according to a first embodiment of the present invention.
Figure 2:
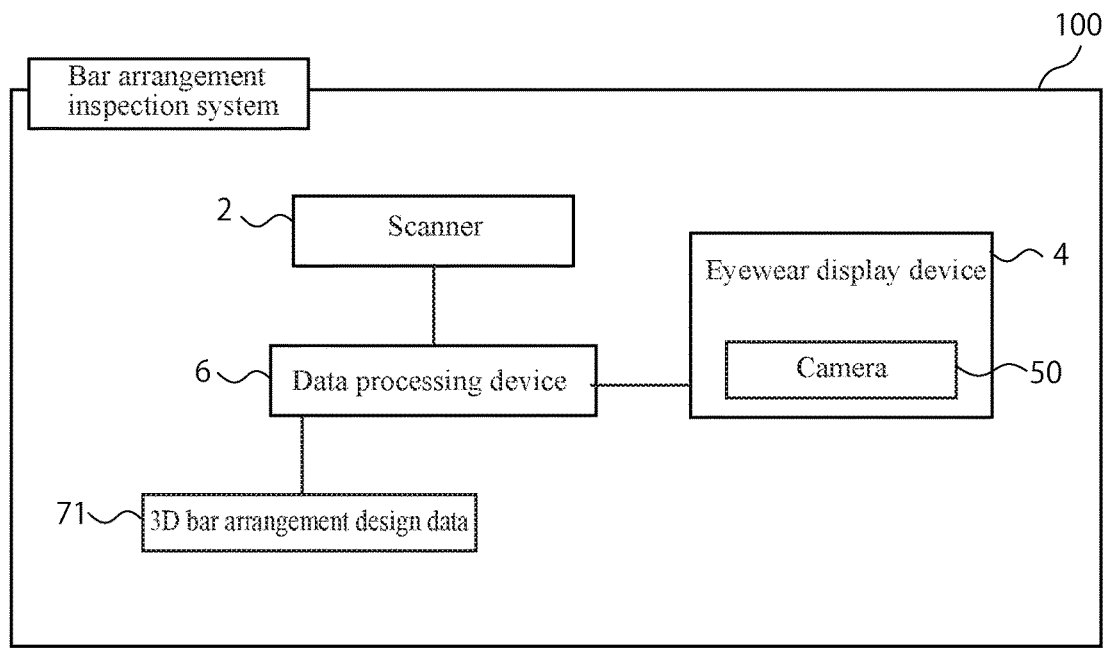
FIG. 2 is a block diagram of the same system.

FIG. 1 is a block diagram illustrating an outline of a usage state of a bar arrangement inspection system (hereinafter, simply referred to as a system) 100 according to an embodiment of the present invention. The system 100 includes at least one scanner 2, an eyewear display device (hereinafter, referred to as an eyewear device) 4 including a camera 50, and a data processing device 6. The scanner 2, the eyewear device 4, and the data processing device 6 are wirelessly connected, and can transmit and receive information to and from each other.

The scanner 2 is a ground-mounted three-dimensional laser scanner. The scanner 2 is installed at an arbitrary point within a site of a foundation work that is an inspection range. An instrument installation point is made known by backward intersection or the like. The scanner 2 is installed via a leveling base mounted on a tripod, and includes a base portion 2α provided on the leveling base, a bracket portion 2β that horizontally rotates around an axis H on the base portion 2α, and a light projecting unit 2γ that vertically rotates at a center of the bracket portion 2β.

The eyewear device 4 is a so-called head-mounted display to be worn on the head of a worker. An image of a bar arrangement state in the inspection range is acquired by using the camera 50. The camera 50 acquires an image of a range (referred to as an inspection object range) in the field of view of the camera 50 by one image shooting. A display 41 can display inspection results by superimposing them on actual reinforcing bars.

The data processing device 6 is a laptop computer in the illustrated example. The data processing device 6 conducts a bar arrangement inspection by using three-dimensional point cloud data (hereinafter, simply referred to as point cloud data) acquired by the scanner 2 and an image acquired by the camera 50. Hereinafter, the components will be described in detail.

2. Scanner

Figure 3:
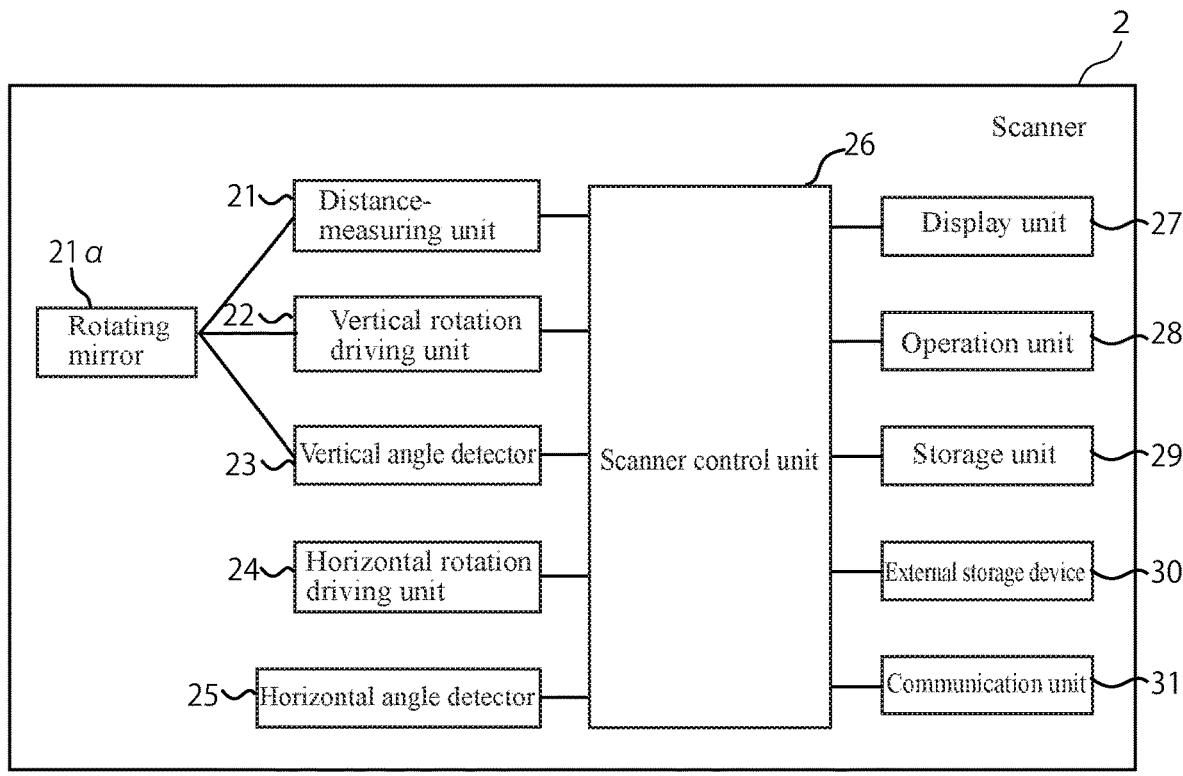
FIG. 3 is a block diagram of a scanner constituting the same system.

FIG. 3 is a configuration block diagram of the scanner 2. The scanner 2 includes a distance-measuring unit 21, a vertical rotation driving unit 22, a vertical angle detector 23, a horizontal rotation driving unit 24, a horizontal angle detector 25, a scanner control unit 26, a display unit 27, an operation unit 28, a storage unit 29, an external storage device 30, and a communication unit 31.

The distance-measuring unit 21 includes a light transmitting unit, a light receiving unit, a light transmitting optical system, a light receiving optical system sharing optical elements with the light transmitting optical system, and a rotating mirror 21α. The light transmitting unit includes a light emitting element such as a semiconductor laser, and emits pulsed light that is distance-measuring light as scanning light. The emitted distance-measuring light enters the rotating mirror 21α through the light transmitting optical system, and is deflected by the rotating mirror 21α and applied to irradiate a measuring object. The rotating mirror 21α is driven to rotate about a rotation axis V by the vertical rotation driving unit 22.

Reflected light retroreflected by the measuring object enters the light receiving unit through the rotating mirror 21α and the light receiving optical system. The light receiving unit includes a light receiving element such as a photodiode. A portion of the distance-measuring light enters the light receiving unit as internal reference light, and based on the reflected light and the internal reference light, a distance to an irradiation point is obtained by the scanner control unit 26.

The vertical rotation driving unit 22 and the horizontal rotation driving unit 24 are motors, and are controlled by the scanner control unit 26. The vertical rotation driving unit 22 rotates the rotating mirror 21α about the axis V in the vertical direction. The horizontal rotation driving unit 24 rotates the bracket portion 2β about the axis H in the horizontal direction.

The vertical angle detector 23 and the horizontal angle detector 25 are rotary encoders. The vertical angle detector 23 measures a rotation angle of the rotating mirror 21α in the vertical direction. The horizontal angle detector 25 detects a rotation angle of the bracket portion 2β in the horizontal direction. Accordingly, a vertical angle and a horizontal angle of a distance measuring optical axis are detected.

The scanner control unit 26 includes at least one processor and at least one memory. The processor is, for example, a CPU (Central Processing Unit), an MPU (Micro Processing Unit), or the like. The memory is, for example, an SRAM (Static Random Access Memory), a DRAM (Dynamic Random Access Memory), or the like. The processor reads data and programs stored in the storage unit 29, etc., to the memory and executes processing for realizing functions of the scanner 2.

Herein, the processor is not limited to a processor configured to perform software processing for all of processings that the processor performs. The processor may include a dedicated hardware circuit (for example, ASIC (Application Specific Integrated Circuit) that performs hardware processing for at least some of processings that the processor performs. That is, the processor may be configured as a circuitry including a combination of at least one processor that operates according to a computer program (software) and at least one dedicated hardware circuits that execute at least some of various processings.

The scanner control unit 26 calculates a distance to an irradiation point for each one-pulse light of distance-measuring light based on a time difference between a light emission timing of the light transmitting unit and a light reception timing of the light receiving unit (reciprocation time of pulsed light). In addition, the scanner control unit calculates an irradiation angle of the distance-measuring light at this time to calculate an angle of the irradiation point.

The scanner control unit 26 acquires all-around point cloud data by acquiring coordinates of each irradiation point by performing all-around (360°) scanning (full-dome scanning) with the distance-measuring light by controlling the distance-measuring unit 21, the rotating mirror 21α, the vertical rotation driving unit 22, and the horizontal rotation driving unit 24. In addition, the scanner control unit 26 realizes a target scanning function for acquiring three-dimensional coordinates of a target by measuring a distance and angles to the target by high-density scanning of the periphery of the target.

The display unit 27 is, for example, a liquid crystal display. The operation unit 28 includes a power key, numeric keys, a decimal point key, +/−keys, an enter key, and cursor move keys, etc. The worker can input operation instructions and information to the scanner 2 from the operation unit 28.

The storage unit 29 is a computer-readable storage medium, which is, for example, an HDD (Hard Disc Drive), a flash memory, etc. The storage unit 29 stores programs for executing the functions of the scanner control unit 26. The external storage device 30 is, for example, a memory card, etc., and stores various data that the scanner 2 acquires.

The communication unit 31 is a communication control device such as a network adapter, a network interface card, a LAN card, or a Bluetooth (registered trademark) adapter, and connects the scanner 2 to the eyewear device 4 and the data processing device 6 by wire or wirelessly. The scanner control unit 26 can transmit and receive information to and from the eyewear device 4 and the data processing device 6 through the communication unit 31.

3. Eyewear Device 4

Figure 4A:
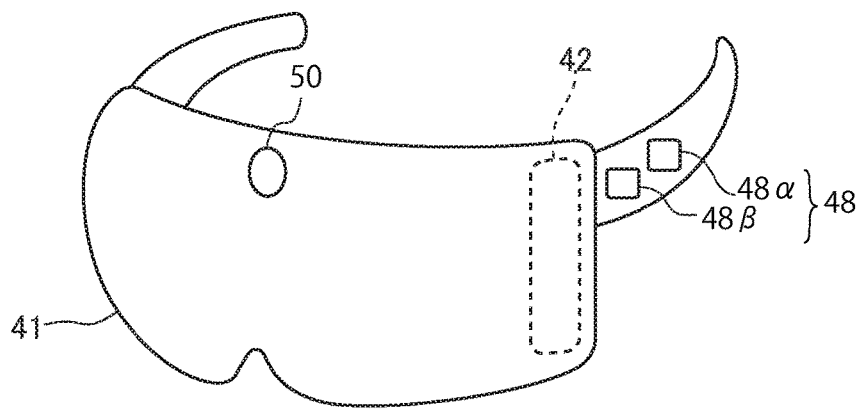
FIG. 4A is an external perspective view of an eyewear display device constituting the same system.
Figure 4B:
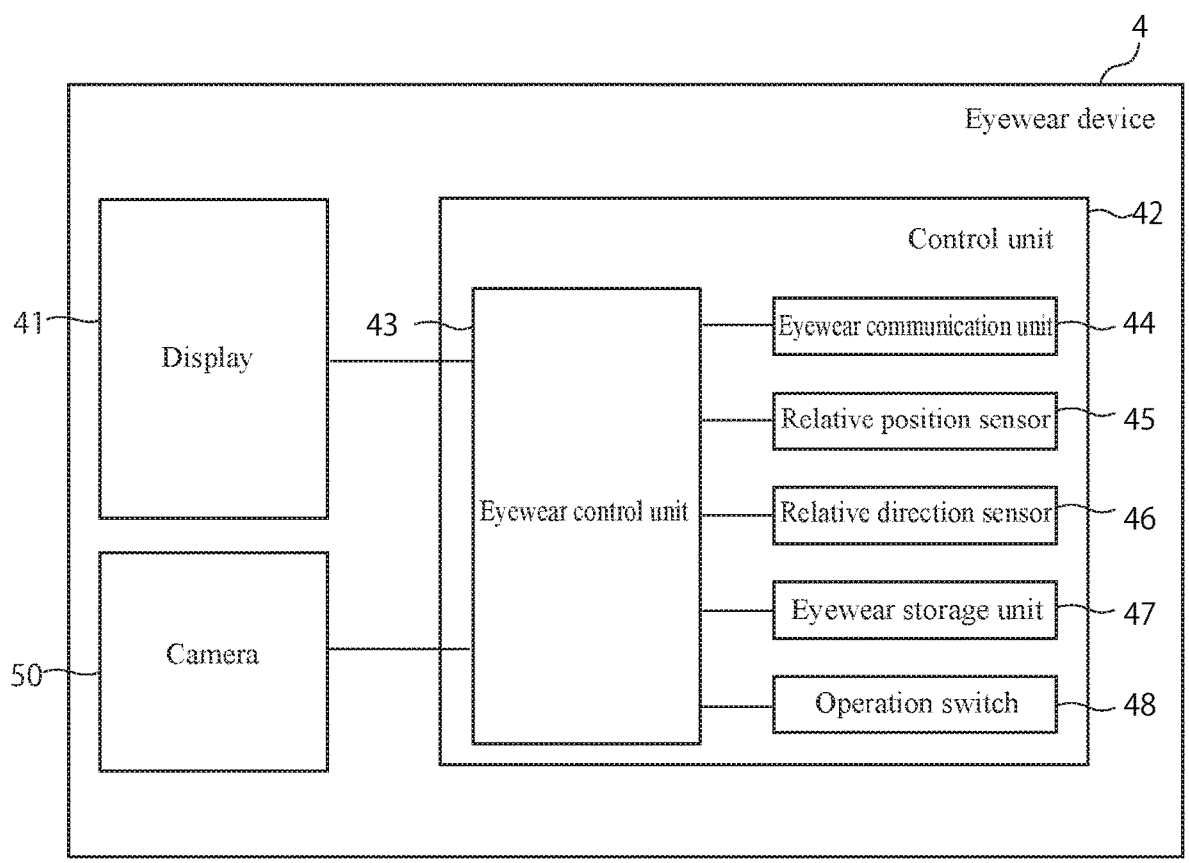
FIG. 4B is a block diagram of the same eyewear display device.

FIG. 4A is an external perspective view of the eyewear device 4, and FIG. 4B is a configuration block diagram of the eyewear device 4. The eyewear device 4 includes the display 41, the camera 50, and a control unit 42. The control unit 42 includes an eyewear control unit 43, a communication unit 44, a relative position sensor 45, a relative direction sensor 46, an eyewear storage unit 47, and an operation switch 48.

The display 41 is a goggles-lens-shaped transmissive display that covers the eyes of a worker when the worker wears it. As an example, the display 41 is an optical see-through display using a half mirror, and is configured to display an image received by the eyewear control unit 43 by superimposing it on a landscape of the site.

Alternatively, it is also possible that the display 41 is a video see-through display, and is configured to display an image received by the eyewear control unit 43 by superimposing it on a frontal landscape image acquired in real time by the camera 50. As a projection method, a virtual image projection method may be used, or a retinal projection method may be used.

The camera 50 is a digital camera including a lens, and an image sensor such as a CCD (Charge-Coupled Device) or a CMOS (Complementary Metal Oxide Semiconductor). The camera 50 is provided at a center of a front surface of the eyewear device 4, and shoots a frontal image of the eyewear device 4 in real time. The image sensor has an orthogonal coordinate system with an origin set at an imaging center of the camera 50, and local coordinates of each pixel are identified. The imaging center of the camera 50 is the center of the eyewear device 4, and an imaging optical axis is the line-of-sight direction of the eyewear device 4.

The eyewear communication unit 44 is the same communication control device as the communication unit 31. The eyewear communication unit 44 connects the eyewear device 4 by wire or wirelessly, preferably wirelessly. The eyewear control unit 43 can transmit and receive information to and from the scanner 2 and the data processing device 6 through the eyewear communication unit 44.

The relative position sensor 45 detects a position (own position) of the eyewear device 4 in an observation site by performing radio determination from a GNSS (Global Navigation Satellite System) antenna, a Wi-Fi (registered trademark) access point, and an ultrasonic oscillator, etc., installed in the observation site.

The relative direction sensor 46 consists of a combination of a three-axis accelerometer or a gyro sensor and a tilt sensor. The relative direction sensor 46 detects a posture (own direction) of the eyewear device 4 while defining the up-down direction as a Z-axis direction, the left-right direction as a Y-axis direction, and the front-rear direction as an X-axis direction. Thus, the camera 50 can acquire an image in a state where its position and direction are known.

The eyewear storage unit 47 is a computer-readable storage medium, which is, for example, a memory card or the like. The eyewear storage unit 47 stores programs for the eyewear control unit 43 to perform the functions.

The operation switch 48 is, for example, a push button provided on a temple portion. The operation switch 48 includes a power button 48α for powering ON/OFF a power supply of the eyewear device 4, and a shooting button 48β for shooting a still image with the camera 50.

The eyewear control unit 43 includes, like the scanner control unit 26 of the scanner 2, at least one processor (for example, CPU) and at least one memory (for example, SRAM, DRAM, or the like). By reading programs stored in the eyewear storage unit 47 and developing them to the memory by the processor, various functions of the eyewear device 4 are realized.

The eyewear control unit 43 outputs information on the position and direction of the eyewear device 4 detected by the relative position sensor 45 and the relative direction sensor 46 to the data processing device 6. In addition, the eyewear control unit displays data received from the data processing device 6 on the display 41 of the eyewear device 4 by superimposing it on a landscape of the inspection site.

4. Data Processing Device 6

Figure 5:
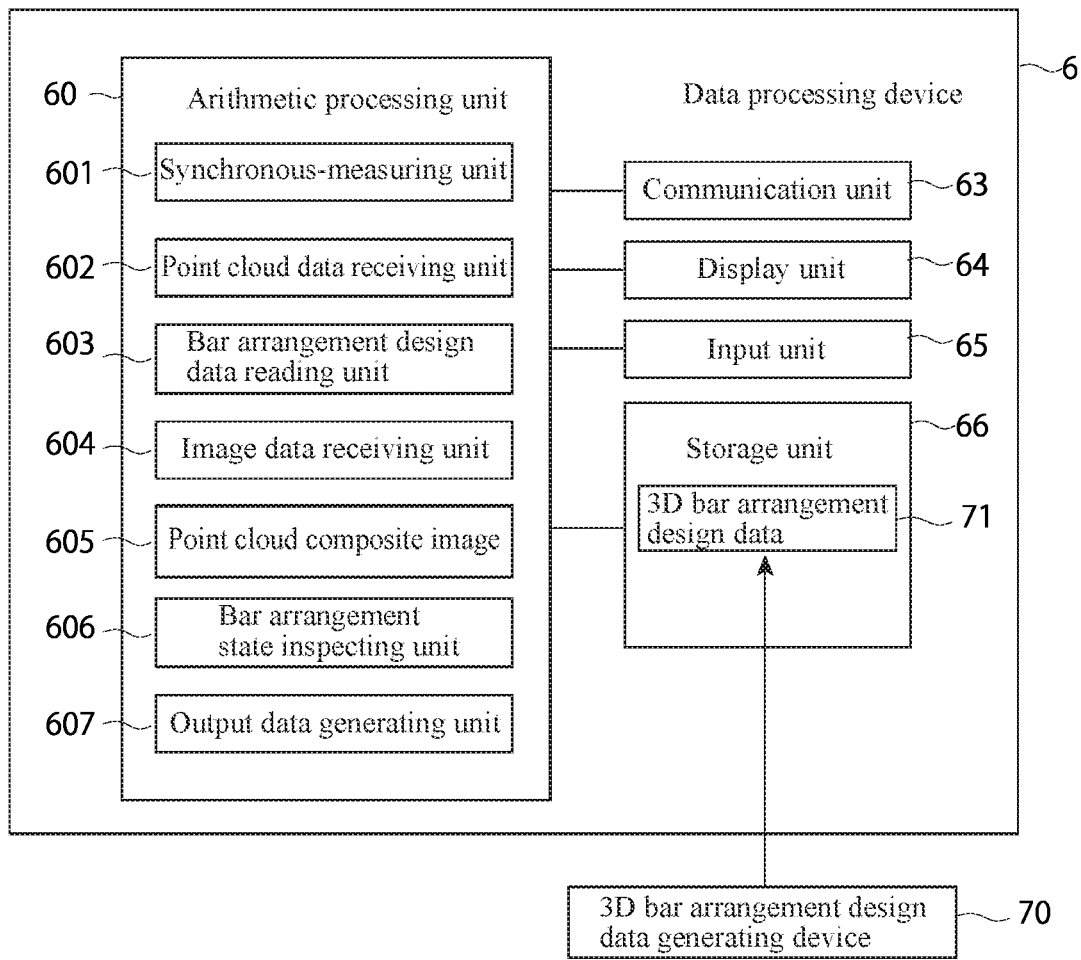
FIG. 5 is a block diagram of a data processing device constituting the system described above.

FIG. 5 is a configuration block diagram of the data processing device 6. The data processing device 6 is a so-called computer, and is typically a personal computer, a server computer, or the like, or may be a tablet terminal, a smartphone, or the like. An arithmetic processing unit 60 of the data processing device 6 corresponds to the system control unit set forth in the claims. The system control unit may be one computer like the data processing device 6, or may be a computer system in which a plurality of computers dispersively perform processings. In this case, the system may logically use some of processing resources of the one or more computers. The system control unit may be configured as a portion of the eyewear device 4, or as a portion of the scanner 2. A configuration may be made so that some of processings of the data processing device 6 are performed by the eyewear device 4, or some of the processings are performed by the scanner 2.

The data processing device 6 includes at least the arithmetic processing unit 60, a communication unit 63, a display unit 64, an input unit 65, and a storage unit 66.

The communication unit 63 is a communication control device equivalent to the communication unit 31 of the scanner 2, and enables the data processing device 6 to wirelessly communicate with the scanner 2 and the eyewear device 4. The arithmetic processing unit 60 can transmit and receive information to and from the scanner 2 and the eyewear device 4 through the communication unit 63.

The display unit 64 is, for example, a liquid crystal display. The input unit 65 is, for example, a keyboard, a mouse, etc., and can input various commands, selections, and determinations, etc., from a worker.

Like the scanner control unit 26 of the scanner 2, the arithmetic processing unit 60 is a control arithmetic unit including at least one processor (for example, CPU or GPU), and at least one memory (for example, SRAM, DRAM, or the like). By reading programs stored in the storage unit 66 and developing them to the memory by the processor, various functions of the data processing device 6, particularly functions of the following functional units, are realized.

The arithmetic processing unit 60 includes, as functional units, a synchronous-measuring unit 601, a point cloud data receiving unit 602, a bar arrangement design data reading unit 603, an image data receiving unit 604, a point cloud composite image generating unit 605, a bar arrangement state inspecting unit 606, and an output data generating unit 607.

The synchronous-measuring unit 601 synchronizes the scanner 2, the eyewear device 4 (camera 50), and the data processing device 6. Synchronization is an operation to enable management of information including position coordinates such as a position and a posture of the eyewear device 4 (camera 50), and design data, etc., to be handled by the data processing device 6 in a common coordinate space with an origin set at a common reference point. An example considered to be preferable is shown below, but it is only required that the synchronization is made by a proper method based on knowledge of a person skilled in the art.

First, for the system 100, a reference point and a reference direction are set on an inspection site, and the scanner 2 and the data processing device 6 are synchronized. As the reference point, a known point (a point whose coordinates are known) or an arbitrary point at the site is selected. A characteristic point different from the reference point is selected, and a direction from the reference point toward this characteristic point is defined as the reference direction. Absolute coordinates of the scanner 2 are grasped by observation according to backward intersection including the reference point and the characteristic point by using the target scanning function of the scanner 2, and are transmitted to the data processing device 6. The synchronous-measuring unit 601 recognizes absolute coordinates of the reference point as (x, y, z)=(0, 0, 0), and recognizes the reference direction as a horizontal angle of 0°. Accordingly, in relation to the information from the scanner 2, the data processing device 6 is enabled to manage a relative position and a relative direction of the scanner 2 in the space with an origin set at the reference point.

Next, the eyewear device 4 and the data processing device 6 are synchronized. The eyewear device 4 is installed at the reference point, and in a state where the eyewear device 4 is leveled, the line-of-sight direction of the eyewear device 4 is matched with the reference direction, and (x, y, z) of the relative position sensor 45 is set to (0, 0, 0), and (roll, pitch, yaw) of the relative direction sensor is set to (0, 0, 0). Afterwards, in relation to information from the eyewear device (camera 50), the data processing device 6 is accordingly enabled to manage the relative position and the relative direction of the eyewear device 4 (camera 50) in the space with an origin set at the reference point.

The point cloud data receiving unit 602 receives three-dimensional point cloud data of the entire site acquired by full-dome scanning by the scanner 2 through the communication unit 63.

The bar arrangement design data reading unit 603 reads 3D bar arrangement design data (three-dimensional bar arrangement design data) to be described later, stored in the storage unit 66.

The image data receiving unit 604 receives image data acquired with the camera 50 through the communication unit 63.

Figure 6A:
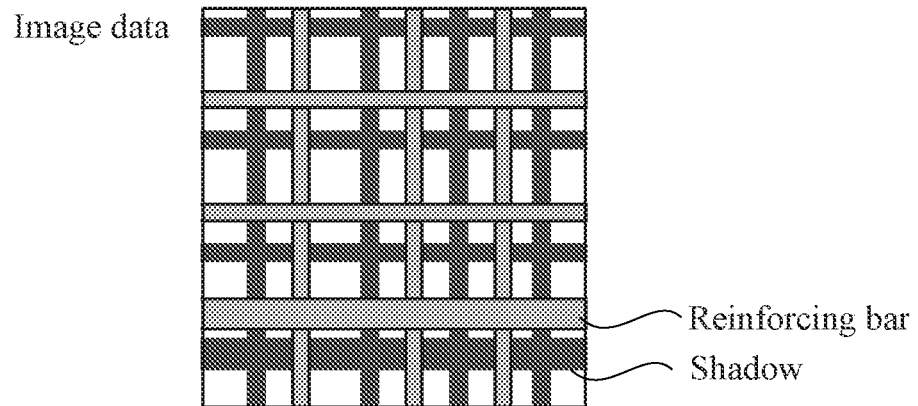
FIGS. 6A, 6B, and 6C are views respectively describing image data, point cloud data, and a point cloud composite image.
Figure 6B:
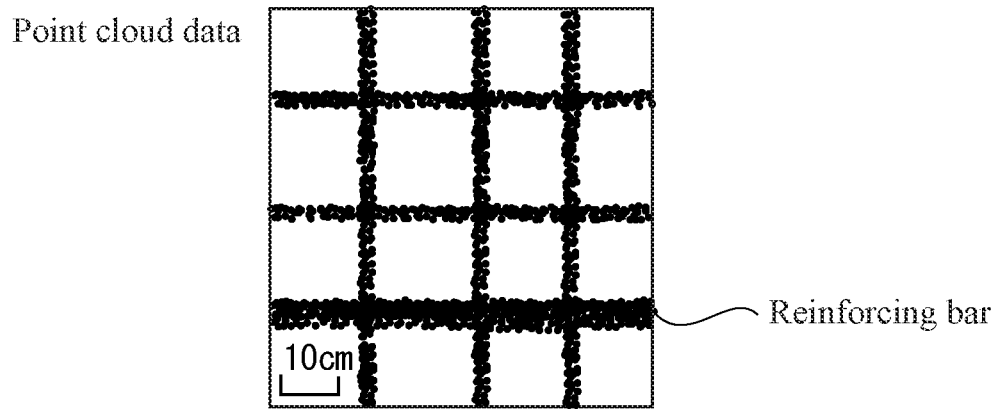
Figure 6C:
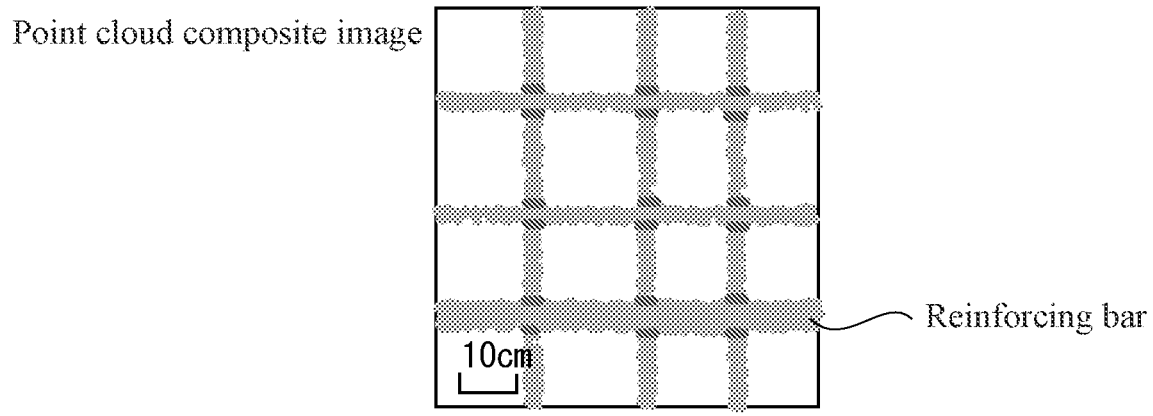

The point cloud composite image generating unit 605 generates a point cloud composite image by combining the image data acquired with the camera 50 with the three-dimensional point cloud data acquired by the scanner 2. FIG. 6A illustrates an image of image data, FIG. 6B illustrates an image of point cloud data, and FIG. 6C illustrates an image of a point cloud composite image. The image data is data including color information, and shadow, etc., may be reflected thereon. On the other hand, the point cloud data is not influenced by shadow, but does not include color information. Coordinates of each point of the point cloud data have been identified, so that actual dimensions can be known. The point cloud composite image shows data including color information that the image data has, and coordinate information of each point that the point cloud data includes, and actual dimensions can be known. That is, by using a point cloud composite image in order to identify a bar arrangement state, dimensions can be identified without setting of a reference marker such as a ruler.

The bar arrangement state inspecting unit 606 inspects a bar arrangement state by using a point cloud composite image, and outputs inspection result data. Details of the bar arrangement state inspecting unit 606 will be described later.

The output data generating unit 607 generates output data to be displayed on the display unit or the display 41 of the eyewear device 4 based on the bar arrangement state inspection result data.

The storage unit 66 is, for example, an HDD, an SSD (Solid State Drive), or the like. In the storage unit 66, the above-described 3D bar arrangement design data (hereinafter, referred to also as bar arrangement design data) 71 is stored. In addition, in the storage unit 66, when the functional units of the arithmetic processing unit 60 are realized as software, programs for executing the respective functions are stored.

The bar arrangement design data 71 is created as three-dimensional data of a drawing corresponding to a bar arrangement detailed drawing. The bar arrangement detailed drawing illustrates an arrangement state of reinforced concrete members, and is data for which information on the bar arrangement state included in design data corresponding to a design drawing. The bar arrangement state includes, for example, the types (materials and thicknesses) of reinforcing bars, pitches between and the numbers of reinforcing bars, arrangement of spacers for preventing insufficient reinforcement cover depth, main reinforcement directions, the types of reinforcing bar joints, and binding positions, etc. The bar arrangement design data 71 includes at least one of these information.

The bar arrangement design data 71 is in advance generated by the 3D bar arrangement design data generating device 70 and stored in the storage unit 66. The 3D bar arrangement design data generating device 70 is a computer including at least one processor and at least one memory, equivalent to the data processing device 6. The bar arrangement design data generating device 70 generates the bar arrangement design data 71 by manually or automatically imparting information on a bar arrangement state to three-dimensional design data created as 3D CAD data.

Figure 7:
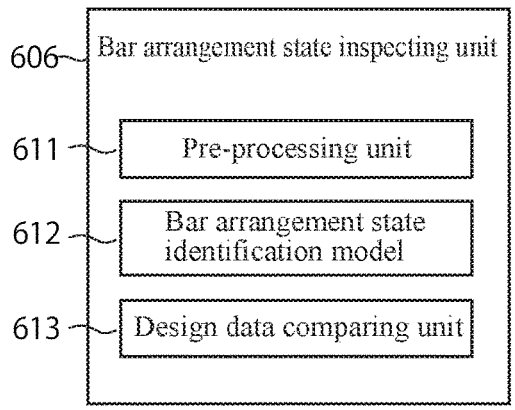
FIG. 7 is a diagram describing a bar arrangement state inspecting unit of the same data processing device.

Next, details of the bar arrangement state inspecting unit 606 will be described with reference to FIGS. 7 and 8. As illustrated in FIG. 7, the bar arrangement state inspecting unit 606 includes a preprocessing unit 611, a bar arrangement state identification model 612, and a design data comparing unit 613.

The preprocessing unit 611 applies image processing for realizing easy recognition of reinforcing bars to a point cloud composite image input as an inspection object. Publicly known image processing, for example, grayscale conversion, extraction of edges and line segments, and brightness value averaging, etc., are applied. In addition to this, the point cloud composite image may be enlarged or reduced in size to be a predetermined scale size. The composite image data is data including position coordinates, that is, actual dimensional information, so that enlargement/reduction to a predetermined scale size is possible without concurrently shooting a reference marker such as a ruler.

Figure 8:
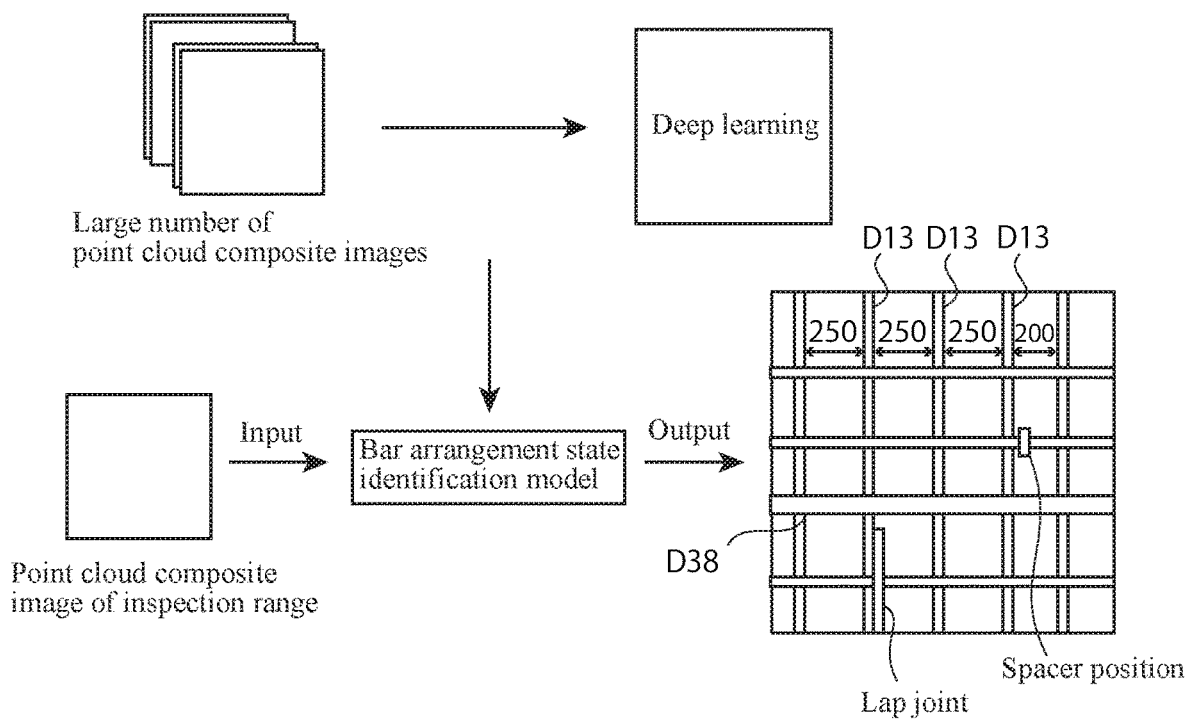
FIG. 8 is a diagram describing a method for generating a bar arrangement state identification model of the same data processing device.

The bar arrangement state identification model 612 is a learned model that is obtained by learning, as illustrated in FIG. 8, for example, a large number of point cloud composite images for learning created by imaging a large number of bar arrangement states and acquiring point cloud data, and labeled based on the types (materials, shapes, and thicknesses (diameter dimensions)) of reinforcing bars, bar arrangement intervals and the numbers of reinforcing bars, arrangement of spacers for preventing insufficient reinforcement cover depth, main reinforcement directions, the types of reinforcing bar joints, and binding positions, etc., as learning data. As data for learning, a large number of point cloud composite images generated in the same manner as the point cloud composite images by imaging various bar arrangement states in general bar arrangement methods are used. Image data may also be used together.

When a point cloud composite image obtained by imaging the inspection range is input to the bar arrangement state identification model 612, the types (materials and thicknesses) of reinforcing bars, bar arrangement intervals and the numbers of reinforcing bars, arrangement of spacers for preventing insufficient reinforcement cover depth, main reinforcement directions, and the types of reinforcing bar joints, are identified, and these matters are associated with their positions and output. Learning is performed by a computer that includes, like the data processing device 6, at least one processor and at least one memory. As a learning method, for example, deep learning using convolutional neutral networks (CNN), recurrent neutral networks (RNN), and Boltzmann machines, etc., can be used.

The types of reinforcing bars are named such as D3, D13, D38, SR295 . . . , etc., based on their materials, shapes, and diameter dimensions according to the JIS standards. These names may be used for the labels of the types of reinforcing bars.

In preprocessing, in a case where a point cloud composite image is enlarged/reduced in size to be a predetermined scale size, by using image data with the same predetermined scale size as learning data to be used for learning, the accuracy of the bar arrangement state identification is increased.

When a point cloud composite image of an inspection range is input to the bar arrangement state identification model 612, bar arrangement state data is output which includes, for example, as in an example illustrated in the lower right portion of FIG. 8, detected bar arrangement state information, that is, information on the types of reinforcing bars (materials, shapes, and thicknesses (diameter dimensions)), bar arrangement pitches and the numbers of reinforcing bars, arrangement of spacers for preventing insufficient reinforcement cover depth, main reinforcement directions, the types of reinforcing bar joints, and binding positions, etc.

The design data comparing unit 613 compares a bar arrangement state identified from the point cloud composite image with the bar arrangement design data 71, and outputs a position of an error in an actual bar arrangement state and details of the error as bar arrangement inspection results. Specifically, whether there is an error can be confirmed by outputting the types of reinforcing bars, bar arrangement intervals and the numbers of reinforcing bars, arrangement of spacers for preventing insufficient reinforcement cover depth, main reinforcement directions, the types of reinforcing bar joints, and binding positions, etc., in association with position information in the inspection range.

5. Bar Arrangement Inspection Method (Processing of Bar Arrangement Inspection System 100)

Figure 9:
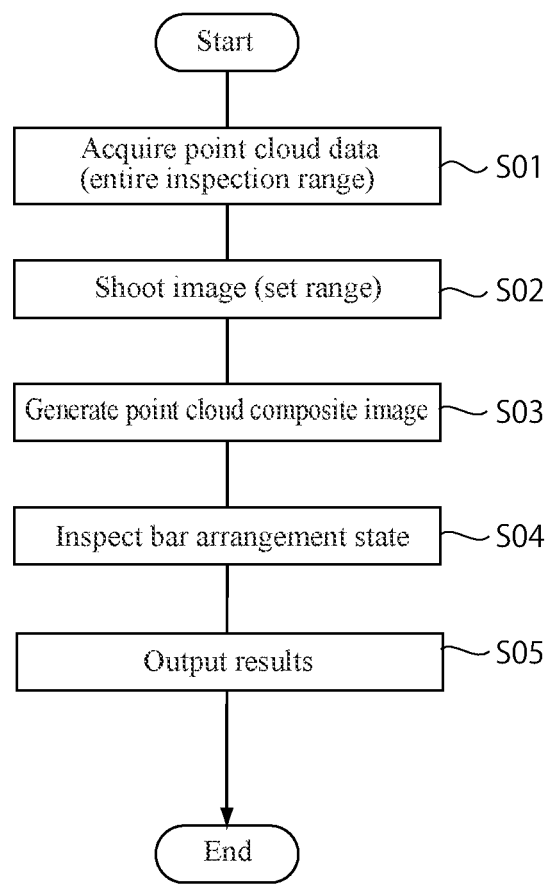
FIG. 9 is a flowchart of an outline of a bar arrangement inspection method using the system described above.

Next, a bar arrangement inspection method will be described. FIG. 9 is a flowchart of an outline of a bar arrangement inspection method using the system 100 according to the present embodiment.

In Step S01, the scanner 2 is installed at a known point, and by executing full-dome scanning, point cloud data of the entire inspection range is acquired. This entire inspection range does not strictly mean the entirety of the inspection range, but may be a range that a worker needs in the inspection range. The acquired point cloud data is transmitted to the data processing device 6. The point cloud data of the entire site may be acquired by one full-dome scanning. The point cloud data may be acquired by using a plurality of scanners 2. Alternatively, the point cloud data may be acquired by performing full-dome scanning multiple times while changing the installation point.

Next, in Step S02, the worker shoots an image of a partial range (inspection object range) set in the inspection range by the camera 50. Specifically, the partial range set in the inspection range is a range of an angle of view of the camera, and is a range that the worker will image for inspection. A shot image is transmitted to the data processing device 6.

Next, in Step S03, the data processing device 6 combines the received point cloud data with image to generate a point cloud composite image.

Next, in Step S04, the data processing device 6 inspects a bar arrangement state by using the point cloud composite image.

Next, in Step S05, the data processing device 6 outputs inspection results. The output of the inspection results may be displayed on the display 41 of the eyewear device 4, displayed on the display unit 64 of the data processing device 6, or may be output as an output of a report from the data processing device 6 to external equipment such as a printer.

6. Bar Arrangement Inspection Method (Processing of Data Processing Device 6)

Figure 10:
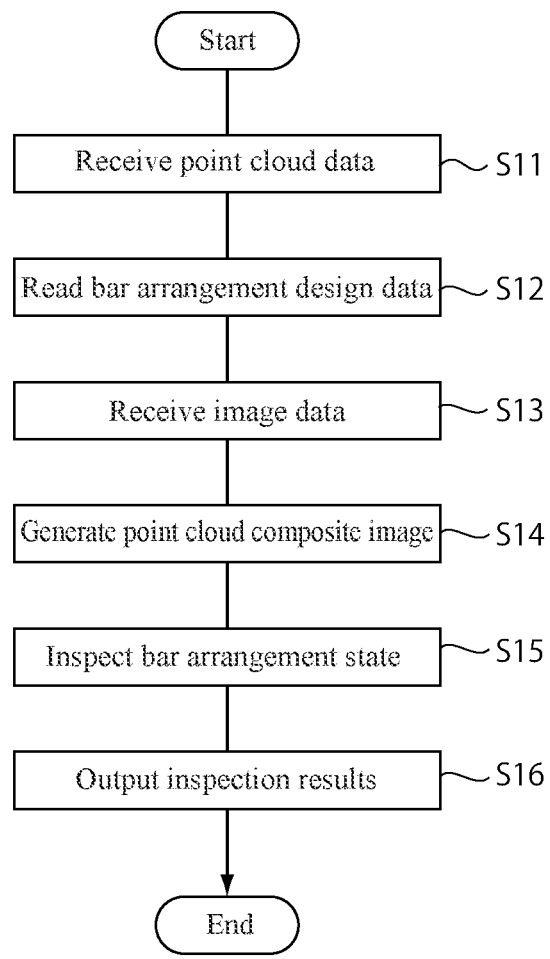
FIG. 10 is a flowchart of processing of the data processing device in the same method.
Figure 11:
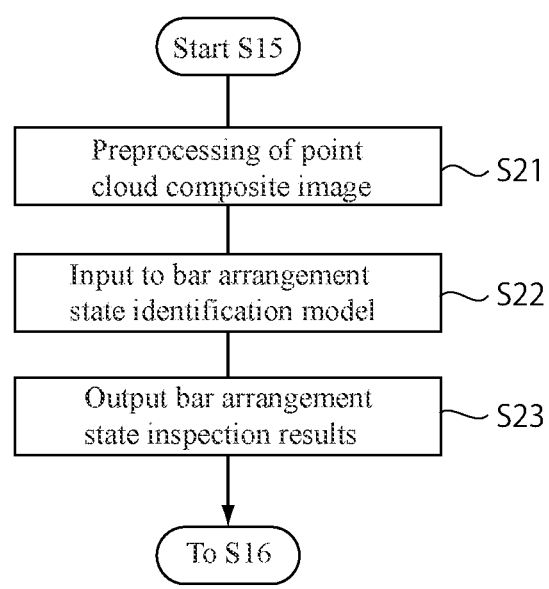
FIG. 11 is a flowchart describing details of processing of a bar arrangement state inspection in the same method.

FIG. 10 is a flowchart of processing of the data processing device 6 in the above-described bar arrangement inspection method. FIG. 11 is a detailed flowchart of Step S15.

As the processing starts, first, in Step S11, the point cloud data receiving unit 602 receives all-around point cloud data acquired by the scanner 2.

Next, in Step S12, the bar arrangement design data reading unit 603 reads the bar arrangement design data 71 from the storage unit 66. The order of Steps S11 and S12 is not limited to this, and the data may be read when the bar arrangement state inspecting unit 606 conducts the inspection.

Next, in Step S13, the image data receiving unit 604 receives image data of the inspection object range from the camera 50.

Next, in Step S14, the point cloud composite image generating unit 605 combines the image data of the inspection object range with point cloud data corresponding to the inspection object range to generate a point cloud composite image. Accordingly, a point cloud composite image that has accurate position coordinate information and has the same colors as those of the photograph is obtained.

Next, in Step S15, the bar arrangement state inspecting unit 606 inspects a bar arrangement state in the inspection object range by comparing the point cloud composite image of the inspection object range with the 3D bar arrangement design data 71 of a corresponding portion.

Specifically, in Step S21, the preprocessing unit 611 applies image processing for realizing easy recognition of reinforcing bars to the point cloud composite image input as an inspection object.

Next, in Step S22, the composite image of the inspection object range is input to the bar arrangement state identification model, and the bar arrangement state in the inspection object range is identified and output as bar arrangement state data.

Next, in Step S23, the 3D bar arrangement design data 71 read in Step S12 is compared with the bar arrangement state data output in Step S22, a portion having a difference (bar arrangement error) is identified, associated with a position of this portion, and stored as three-dimensional bar arrangement state inspection result data in the storage unit 66, and Step S15 is ended. The resultantly obtained bar arrangement state inspection results are accumulated for each inspection object range (for each time of image shooting by the camera 50), and the entire inspection site is inspected while the inspection object range is moved, and accordingly, three-dimensional bar arrangement state inspection result data of the entire inspection site can be acquired.

Next, in Step S16, the output data generating unit 607 generates output data from the bar arrangement state inspection result data, and displays and outputs the output data on the display 41 of the eyewear device 4 or the display unit of the data processing device 6, and ends the processing. Alternatively, the output data may be output as a report from the data processing device 6 through a printer or the like.

7. Examples of Output Data

Figure 12A:
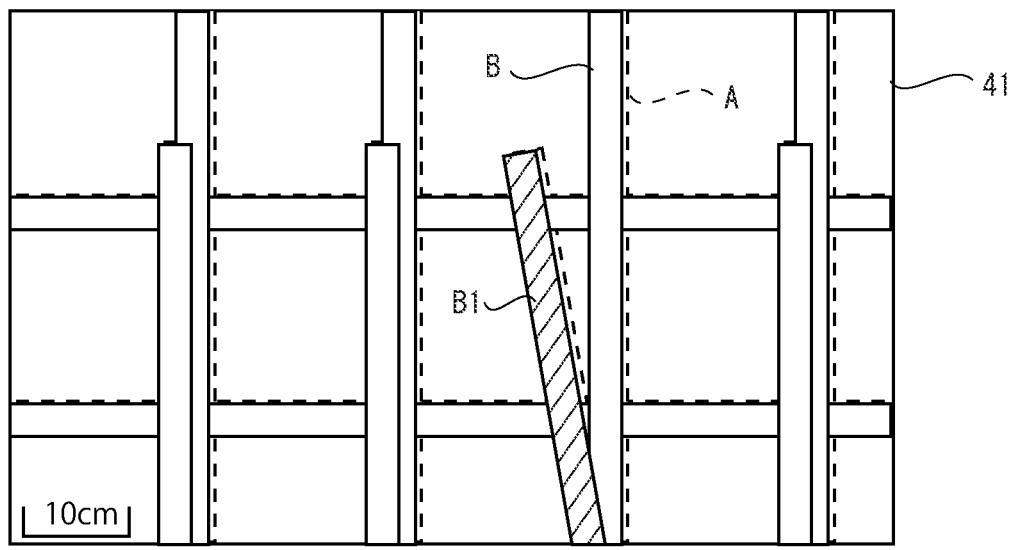
FIGS. 12A and 12B are views illustrating examples of display of bar arrangement inspection results.
Figure 12B:
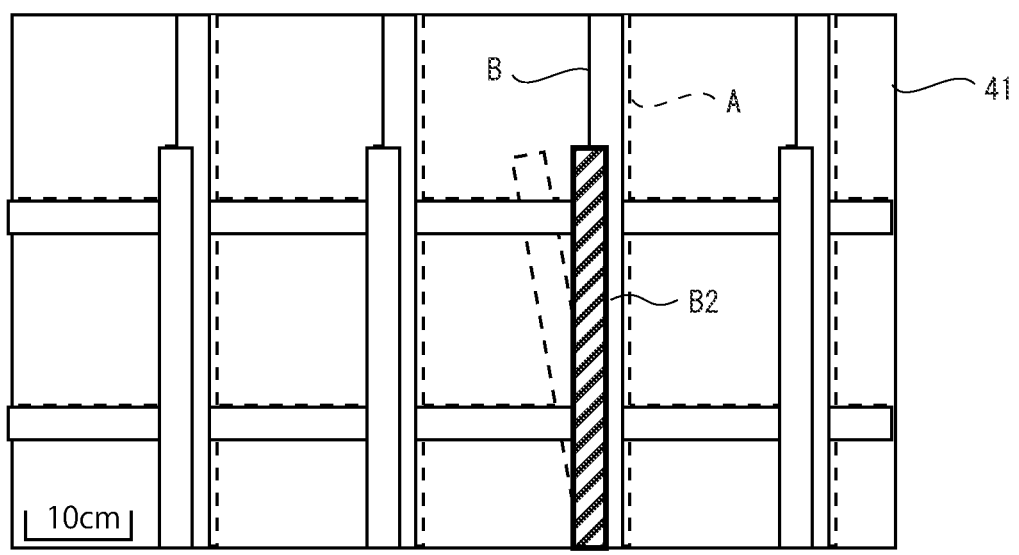

FIGS. 12A and 12B illustrate examples of output data to be displayed on the display 41 of the eyewear device 4. In the drawings, actual reinforcing bars A are represented by dashed lines, and output data B is represented by solid lines. An actual image is a three-dimensional image, however, it is illustrated as a two-dimensional image.

The output data may be displayed so that, for example, as illustrated in FIG. 12A, the output data is superimposed on the actual reinforcing bars A so as to enable identification of a bar arrangement error portion, for example, so as to represent the error portion by display B1 in a highlight color. In the illustrated example, a displacement of a reinforcing bar at a lap joint portion is displayed as an error portion.

As illustrated in FIG. 12B, a correct bar arrangement state may be displayed in a highlighted manner at the bar arrangement error portion by being superimposed on the actual reinforcing bars A at the site. By displaying a correct bar arrangement state superimposed on on-site actual objects by using the eyewear device 4, a person at the site can grasp the work and items necessary for eliminating the error. In addition, as output data, the images as illustrated in FIGS. 12A and 12B may be displayed on the display unit 64 of the data processing device 6. Such an inspection result image and an image shot with the camera 50 may be arranged side by side and output as a report through a printer.

8. Effects

As described, according to the bar arrangement inspection system of the present invention, a bar arrangement state is inspected by using a point cloud composite image including color information of the image and dimensional information of point cloud data, so that it is not necessary to set a reference marker and a ruler, etc., in the inspection object range, and the burden on the worker is eased. For this, full-dome scanning with the scanner 2 must be performed, however, since full-dome scanning can be automatically performed once the scanner 2 is installed, no trouble occurs. For example, by performing full-dome scanning with the scanner in the early morning, etc., when there are no other workers at the site and performing imaging with the camera 50 in the daytime, efficient work can be performed.

In addition, imaging is performed with the camera 50 provided in the eyewear device 4, so that a worker can acquire a necessary image just by facing the inspection object range and shooting the image without changing his/her posture, and the burden of the work is further reduced.

9. Modification 1

Figure 13:
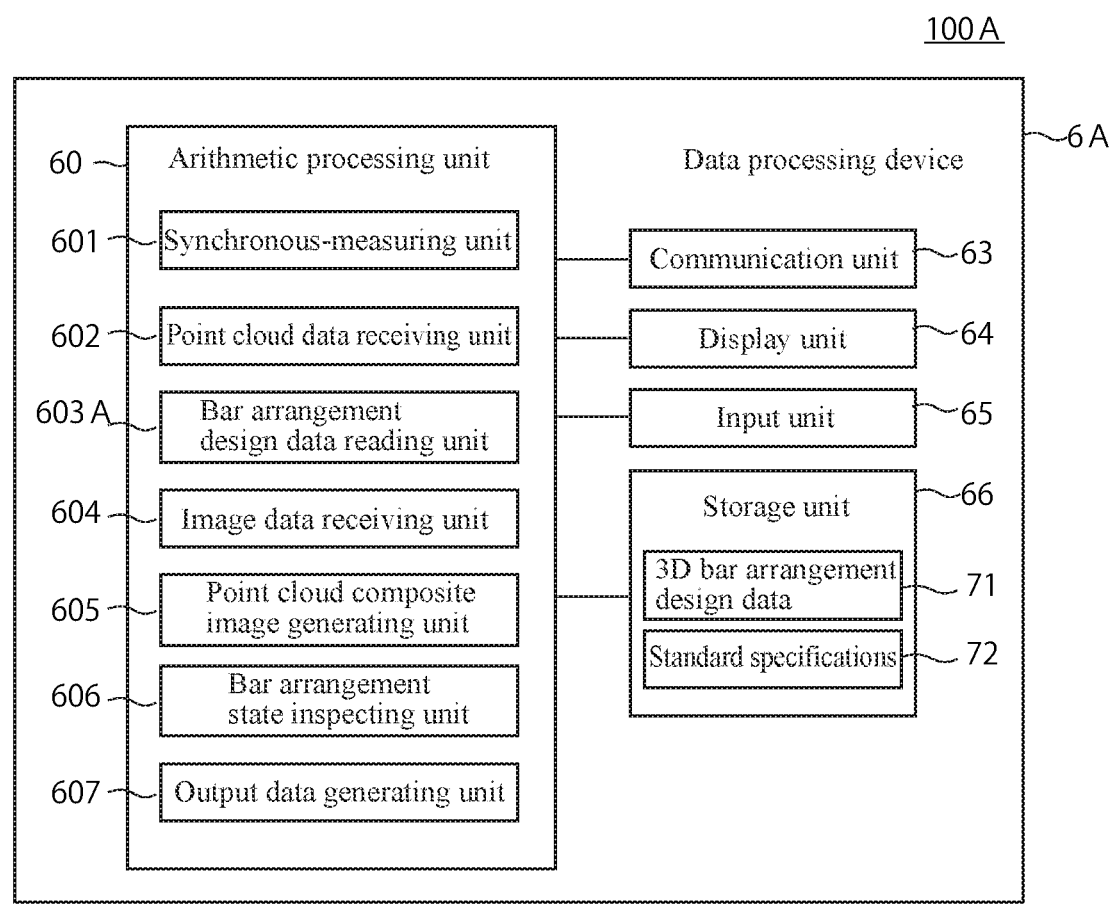
FIG. 13 is a block diagram of a data processing device according to a modification of the same system.
Figure 14:
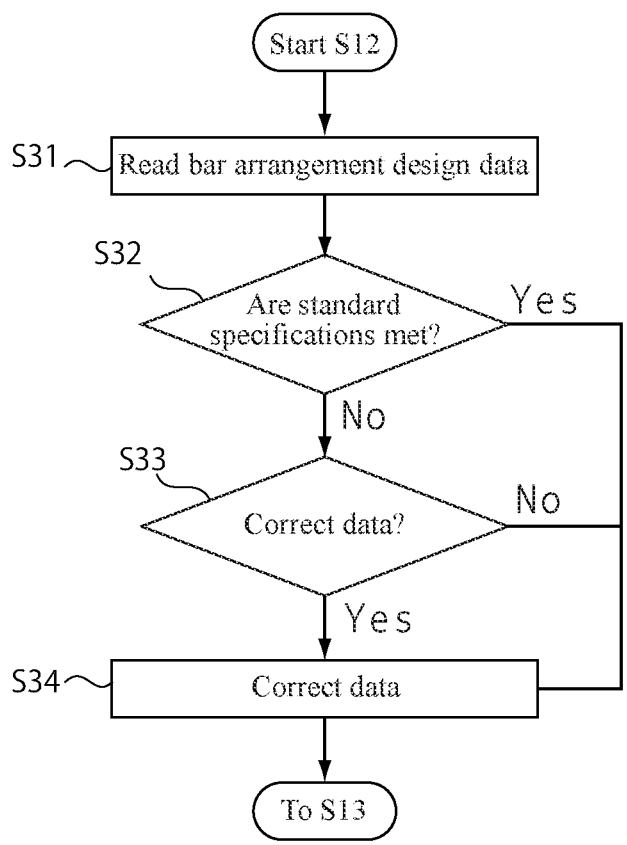
FIG. 14 is a flowchart of bar arrangement design data reading processing of the same data processing device.

FIG. 13 is a configuration block diagram of a data processing device 6A of a system 100A according to Modification 1, and FIG. 14 is a flowchart of processing of a bar arrangement design data receiving unit 61A of the data processing device 6A.

In a bar arrangement inspection, whether actual reinforcing bars are constructed as described in a bar arrangement detailed drawing is inspected. On the other hand, particularly in public works, bar arrangement must conform to public construction work standard specifications. In other work, specifications may be separately prescribed (hereinafter, referred to as standard specifications collectively with public construction work standard specifications). Usually, a bar arrangement detailed drawing is created according to standard specifications. However, the bar arrangement detailed drawing does not conform to the specifications in some cases. Such an error may also occur when creating bar arrangement design data. There is also a case where an original bar arrangement detailed drawing has an error. In the system 100A, whether read bar arrangement design data conforms to the standard specifications is determined, and the data is corrected as needed. For this purpose, the standard specifications are stored in a storage unit 66A.

Specifically, as Step S12 is started, in Step S31, the bar arrangement design data reading unit 603A reads the bar arrangement design data 71. Next, in Step S32, the bar arrangement design data reading unit 603A determines whether the bar arrangement design data 71 meets the standard specifications.

When the bar arrangement design data 71 does not meet the standard specifications (No), in Step S33, the bar arrangement design data reading unit 603A confirms with a user whether to correct the bar arrangement design data 71 so as to meet the standard specifications. The confirmation is made by display on the display 41 of the eyewear device 4, display on the display unit 64 of the data processing device 6, or the like. When the user instructs to correct the data (Yes), in Step S34, the bar arrangement design data reading unit 603A corrects the data and shifts the processing to Step S13.

When the standard specifications are met in Step S32 (Yes), or when no correction is required in Step S33 (No), the processing directly shifts to Step S13.

As described, according to Modification 1, it is possible to confirm whether the bar arrangement design data 71 conforms to the standard specifications, and when a portion not conforming to the standard specifications is found, the bar arrangement design data 71 is corrected. Therefore, in a bar arrangement inspection, an error in the bar arrangement drawing itself can also be checked. This modification is also applicable to other embodiments in the present description.

II. Second Embodiment

Entire Configuration

Figure 15:
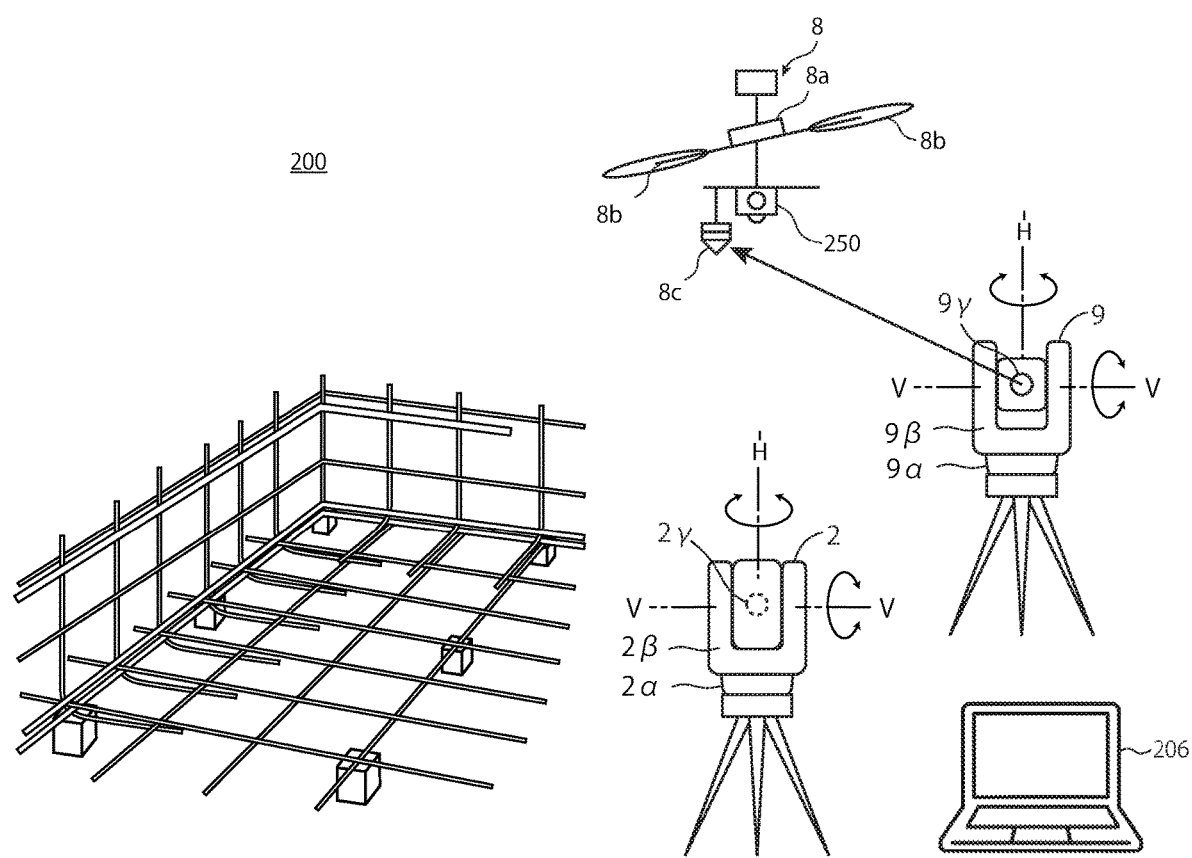
FIG. 15 is a schematic external view of a bar arrangement inspection system according to a second embodiment.
Figure 16:
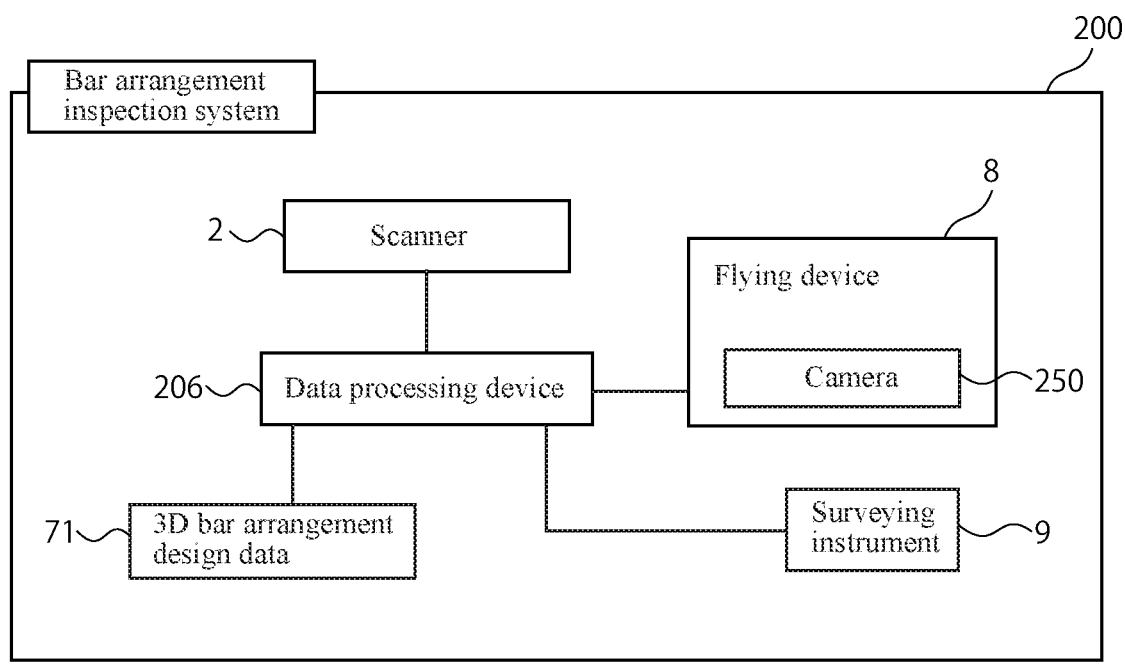
FIG. 16 is a block diagram of the system described above.

FIG. 15 is an external view illustrating a usage state of a bar arrangement inspection system 200 according to a second embodiment, and FIG. 16 is a block diagram.

The system 200 includes a scanner 2, a data processing device 206, a flying device 8 with a camera 250, and a surveying instrument 9. The scanner 2, the data processing device 206, and the flying device 8 with a prism, and the surveying instrument 9 are connected wirelessly, and can transmit and receive information to and from each other. The scanner 2 is the same as the scanner 2 according to the first embodiment.

The flying device 8 is a UAV (Unmanned Air Vehicle) that can fly autonomously. The flying device 8 includes a plurality of propellers 8b radially extending from a main body 8a, a prism 8c as a target, and the camera 250 that shoots image data of an inspection object. The flying device 8 can fly a predetermined flight route, and freely fly according to remote operations.

The surveying instrument 9 is a so-called motor-driven total station. The surveying instrument is installed at an arbitrary installation point within the site via a leveling base mounted on a tripod. The surveying instrument 9 includes a base portion 9α provided on the leveling base, a bracket portion 9β that horizontally rotates about an axis H on the base portion 9α, and a telescope 9γ that vertically rotates at a center of the bracket portion 9β.

A mechanical configuration of the data processing device 206 is equivalent to that of the system 100, so that detailed description thereof is omitted.

2. Flying Device 8

Figure 17:
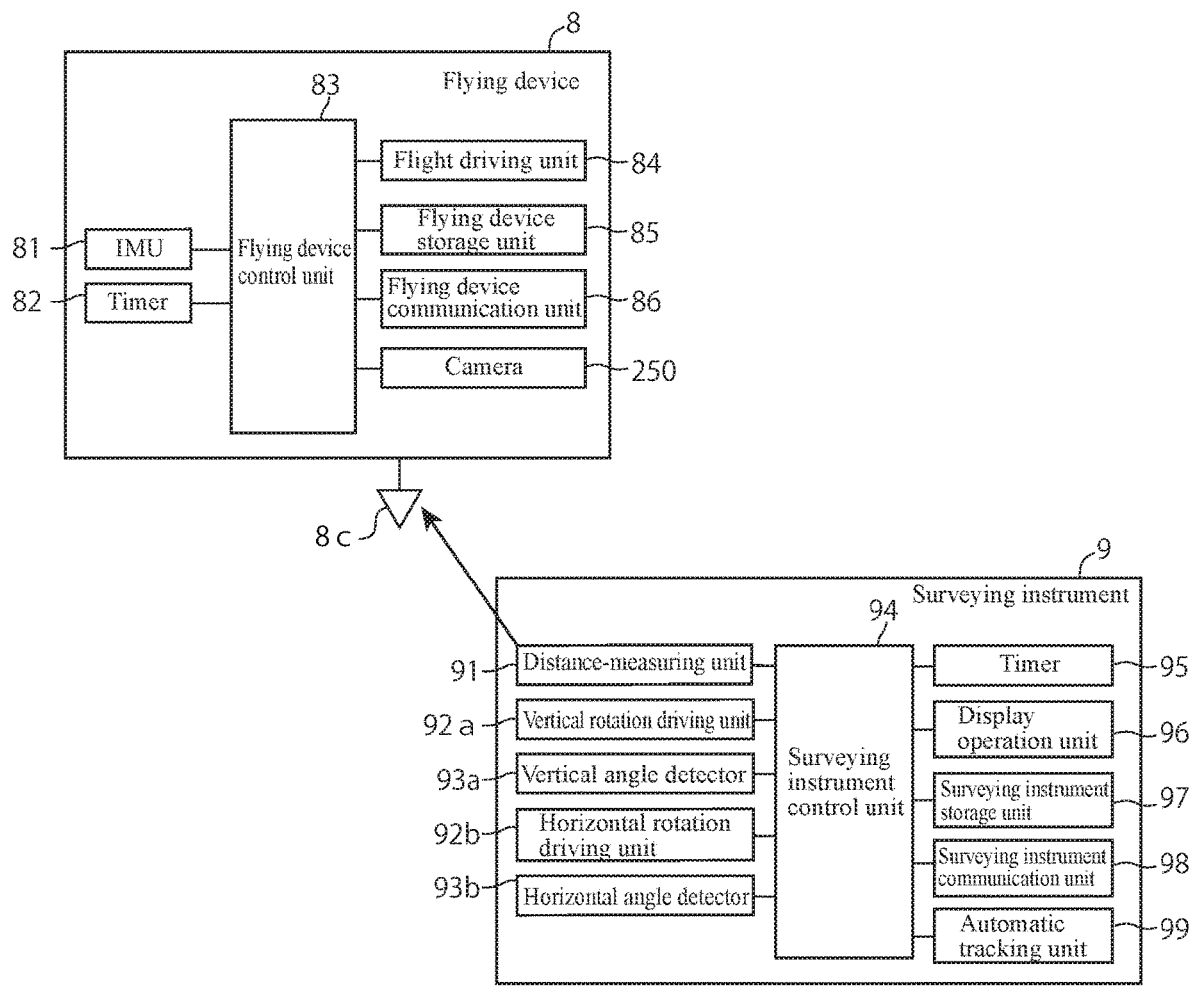
FIG. 17 is a block diagram of a surveying instrument and a flying device constituting the same system.

FIG. 17 is a block diagram of the flying device 8 and the surveying instrument 9.

The flying device 8 includes an IMU (Inertial Measuring Unit) 81, a timer 82, a flying device control unit 83, a flight driving unit 84, a flying device storage unit 85, a flying device communication unit 86, a camera 250, and a prism 8c as a target of the surveying instrument 9.

The prism 8c is fixed to the vicinity of the camera 250. The fixation position of the prism 8c may be other positions, however, deviations between an imaging center of the camera and an optical center (optical reflection point) of the prism 8c in the respective roll-axis, pitch-axis, and yaw-axis directions are known before attaching the prism 8c.

The IMU 81 includes a three-axis gyro sensor and a three-axis accelerometer, and acquires angular velocities and accelerations of the flying device 8, that is, the camera 250 in the three-axis directions (roll, pitch, and yaw) to detect a posture of the camera 250.

The timer 82 is a clock that acquires a system time.

The flight driving unit 84 is a propeller motor, and drives the propellers 8b according to control of the flying device control unit 83.

The flying device storage unit 85 is a computer-readable storage medium such as an HDD or a flash memory. The flying device storage unit 85 stores image data acquired with the camera 250.

The camera 250 includes an image sensor such as a CCD sensor or a CMOS sensor, and positions of the respective pixels of the image sensor can be identified on the image sensor.

The flying device control unit 83 is a control arithmetic unit including at least one processor and at least one memory as in the case of the scanner control unit 26, etc. The flying device control unit 83 drives the flight driving unit 84 so as to fly over the entire inspection range by following a flight route determined in advance or designated by a remote operation through the flying device control unit 86. The flying device control unit 83 acquires a system time from the timer 82 at a timing synchronized with an output of a light transmission signal of the surveying instrument 9, shoots an image with the camera 250 at the same timing as distance and angle measurements of the surveying instrument 9, and imparts the time to the image data and posture information of the camera 250 acquired at the time of image shooting. Although a range corresponding to an angle of view of the camera is imaged by one time of image shooting, the flying device 8 flies over the entire inspection range while repeating image shooting with the camera 250 in line with timings of distance and angle measurements of the surveying instrument 9, and accordingly, images of the entire inspection range are shot. The acquired image data are associated with time information and camera posture information acquired at the time of shooting, and transmitted to the data processing device 206.

3. Surveying Instrument 9

The surveying instrument 9 includes a distance-measuring unit 91, a vertical rotation driving unit 92a, a vertical angle detector 93a, a horizontal rotation driving unit 92b, a horizontal angle detector 93b, a surveying instrument control unit 94, a timer 95, a display and operation unit 96, a surveying instrument storage unit 97, a surveying instrument communication unit 98, and an automatic tracking unit 99.

The distance-measuring unit 91 includes a distance-measuring optical system that emits distance-measuring light such as infrared laser to the target, and a distance-measuring light receiving system that receives reflected distance-measuring light by a photodiode or the like. The distance-measuring unit 91 receives reflected distance-measuring light from the target by the distance-measuring light receiving system, and divides a portion of the distance-measuring light and receives it as internal reference light, and measures a distance to the target based on a phase difference between the reflected distance-measuring light and the internal reference light. In addition, angles of the target are measured from detected values detected by the vertical angle detector 93a and the horizontal angle detector 93b.

The vertical rotation driving unit 92a and the horizontal rotation driving unit 92b are motors, and respectively drive a horizontal rotation shaft and a vertical rotation shaft by being controlled by the surveying instrument control unit 94. The vertical angle detector 93a and the horizontal angle detector 93b are absolute encoders or incremental encoders. The horizontal angle detector 93b is provided for the horizontal rotation shaft, and detects a rotation angle in the horizontal direction of the telescope 9γ supported by the bracket portion 9β. The vertical angle detector 93a is provided for the vertical rotation shaft, and detects a rotation angle in the vertical direction of the telescope 9γ.

The display and operation unit 96 is a user interface of the surveying instrument 9, and consists of a touch panel display, and can issue commands and make settings of a survey work and make confirmation of a work status and measurement results, etc.

The surveying instrument storage unit 97 is, for example, an HDD, and in this unit, various programs for the surveying instrument control unit 94 to realize the functions are stored.

The surveying instrument communication unit 98 is a communication control device equivalent to the communication unit 31 of the scanner 2. The surveying instrument communication unit 98 enables information transmission and reception between the surveying instrument 9 and at least the flying device 8 and data processing device 206.

The automatic tracking unit 99 includes a tracking light transmitting system that emits, as tracking light, infrared laser, or the like of a wavelength different from that of the distance-measuring light, and a tracking light receiving system including an image sensor such as a CCD sensor or a CMOS sensor. The automatic tracking unit 99 acquires a landscape image including the tracking light and a landscape image excluding the tracking light, and transmits both images to the surveying instrument control unit 94. The surveying instrument control unit 94 obtains a center of a target image from a difference between the images, detects a position where a deviation of the center of the target image from a visual axis center of the telescope 9γ falls within a certain value as a position of the target, and performs automatic tracking so that the telescope 9γ always faces the target.

The timer 95 acquires a system time.

The surveying instrument control unit 94 is a control arithmetic unit including at least one processor and at least one memory as in the case of the scanner control unit, etc. The surveying instrument control unit controls the vertical rotation driving unit 92a and the horizontal rotation driving unit 92b, and controls the distance-measuring unit 91 and the automatic tracking unit 99. The surveying instrument control unit 94 repeats distance and angle measurements at predetermined intervals while automatically tracking the prism 8c. The surveying instrument control unit 94 acquires a system time from the timer 95 at a timing of an output of a light transmission signal of the distance-measuring unit 91, and imparts the time to distance and angle measurement values. The target position (distance and angles) acquired by the distance-measuring unit 91 are stored in the surveying instrument storage unit 97 together with time information. The surveying instrument control unit 94 associates target coordinate information stored in the surveying instrument storage unit 97 with the time information, and transmits the target coordinate information to the data processing device 206.

4. Data Processing Device 206

Figure 18:
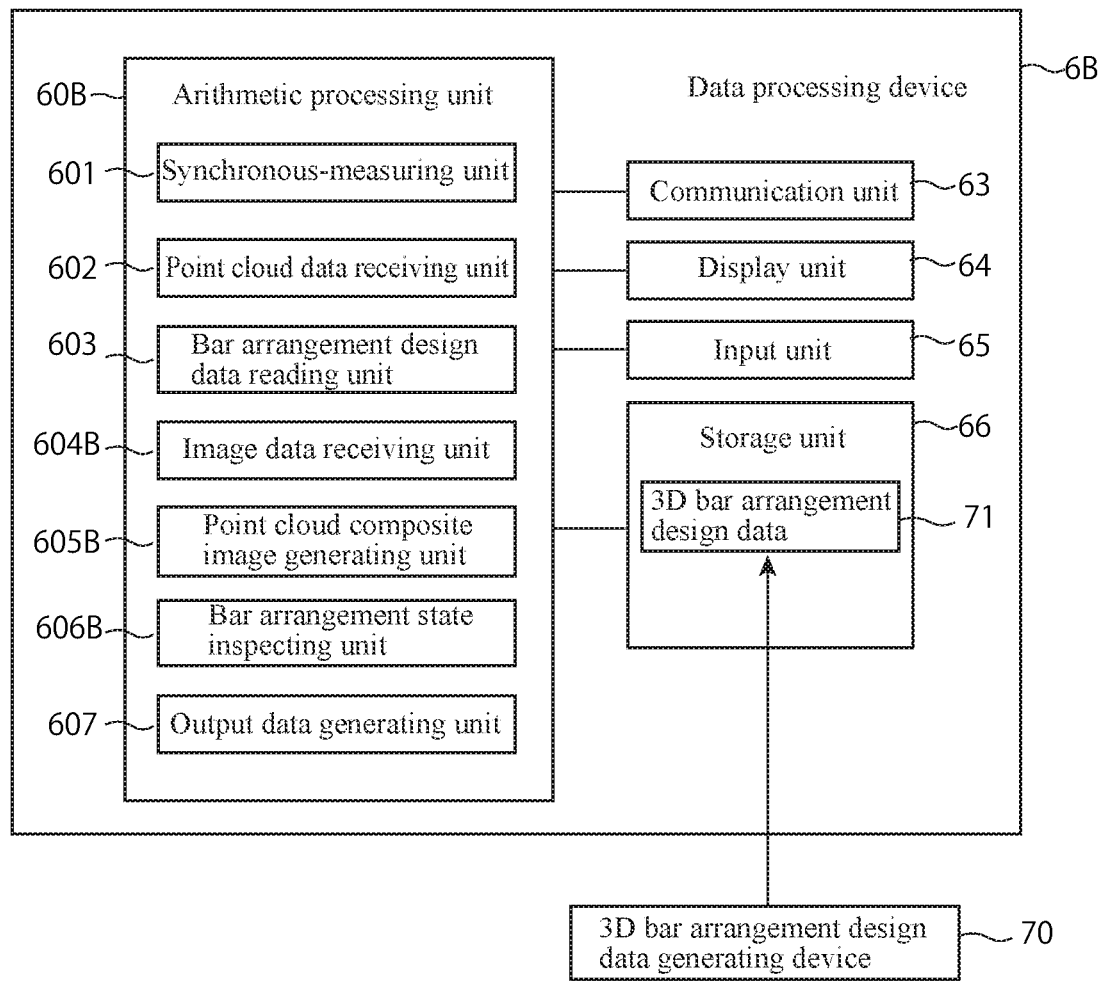
FIG. 18 is a block diagram of a data processing device constituting the same system.

FIG. 18 is a configuration block diagram of the data processing device 206. The data processing device 206 has a configuration roughly equivalent to the configuration of the data processing device 6. The data processing device 206B is different in functions of an image data receiving unit 604B, a point cloud composite image generating unit 605B, and a bar arrangement state inspecting unit 606B.

The image data receiving unit 604B receives a plurality of images of the entire inspection range acquired with the camera 250. Then, the image data receiving unit integrates 604B them based on positions and posture information of the camera 250 associated with the respective images by time, into image data of the entire inspection range (integrated image data).

The point cloud composite image generating unit 605B combines the integrated image data of the entire inspection range by the image data receiving unit 604B with the point cloud data to generate a point cloud composite image of the entire inspection range.

In preprocessing, the bar arrangement state inspecting unit 606B extracts an inspection object range from the point cloud composite image of the entire inspection range, and sections the inspection object range and inputs each section to the bar arrangement state identification model 612. A sectioning method will be described later.

5. Bar Arrangement Inspection Method

Figure 19:
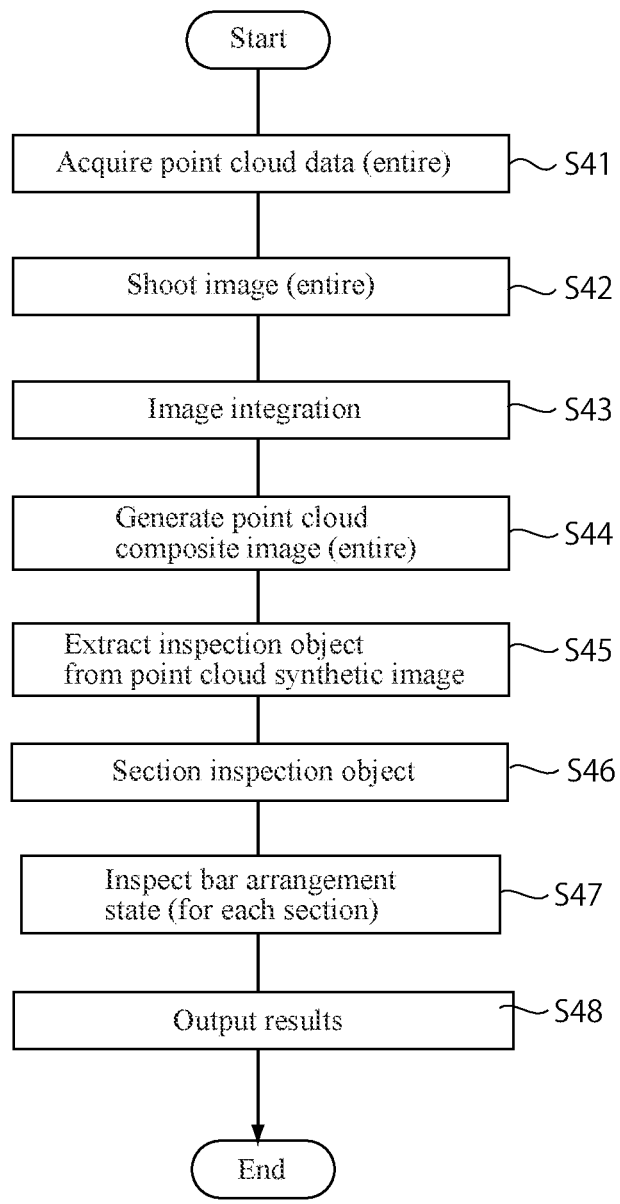
FIG. 19 is a flowchart of a bar arrangement inspection method using the system described above.

Next, a bar arrangement inspection method will be described. FIG. 19 is a flowchart of a bar arrangement inspection method using the system 200 according to the present embodiment.

First, in Step S41, the scanner 2 is installed at a known point, and full-dome scanning is performed to acquire point cloud data of the entire inspection range.

Next, in Step S42, in a state where the prism 8c is automatically tracked by the surveying instrument 9, the flying device 8 is caused to fly over the entire inspection range, and while distance and angle measurements are made at predetermined intervals, at the timing of the distance and angle measurements of the surveying instrument 9, an image is shot with the camera 250. Position information of the camera 250 grasped from position information (three-dimensional coordinates) of the prism 8c acquired by the surveying instrument 9 is associated with image data and posture information (direction) of the camera 250 at this position. An image shot at a predetermined timing with a position and a direction associated by the time while causing the flying device 8 to fly over the entire inspection range is associated with posture information of the camera 250 and the time, and transmitted to the data processing device 6. Distance and angle measurement results of the surveying instrument 9 are also associated with the time and transmitted to the data processing device 6.

Next, in Step S43, the image data receiving unit 604B integrates all image data into one image data including the entire inspection range based on images and posture information input from the camera 250 and position information input from the surveying instrument.

Next, in Step S44, the point cloud composite image generating unit 605B combines the received entire point cloud data with entire image data to generate a point cloud composite image of the entire inspection range.

Next, in Step S45, the bar arrangement state inspecting unit 606B performs, as preprocessing, image processing similar to that of the preprocessing unit 611, and extracts an inspection object range from the point cloud composite image. The inspection object range can be extracted by a method such as pattern matching using characteristic point extraction. (The preprocessing unit 612B (not illustrated) of) the bar arrangement state inspecting unit 606B extracts the extracted inspection object range as an image shot facing the reinforcing bars.

Next, in Step S46, (the preprocessing unit 612B of) the bar arrangement state inspecting unit 606B sections the extracted inspection object range. The inspection object range is sectioned according to the structure type, for example, a floor surface, a wall, columns, and beams, etc. For example, in the case of a wall, the inspection object range is sectioned by 1 meter square, and in the case of columns, the inspection object range is sectioned by one column.

Next, in Step S47, the bar arrangement state inspecting unit 606B inputs each section to the bar arrangement state identification model 612, and compares it with bar arrangement design data of a region corresponding to that section. Comparison results are three-dimensional data including a bar arrangement state (a bar arrangement error and position information thereof) of the entire inspection range.

Next, in Step S48, the inspection results are output as three-dimensional bar arrangement state inspection result data of the entire inspection range, and the processing is ended.

Those resultantly obtained are three-dimensional bar arrangement state inspection result data of the entire inspection range in which a difference (bar arrangement error) in the entire inspection range is associated with a position of the different portion. In this way, for the entire inspection range, an image and point cloud data are acquired, and these are sectioned and the bar arrangement state inspection is conducted for each section, and accordingly, bar arrangement inspection results of the entire inspection range can be acquired at a time, and the inspection time is shortened and the burden on the worker is reduced.

As described, it takes time to acquire point cloud data of the entire inspection range and acquire an image of the entire inspection range. However, according to the configuration described above, these can be automatically performed. In addition, for example, by performing acquisition of point cloud data and acquisition of image data in the early morning, etc., when there are no other workers, other workers' work is prevented from being obstructed by the conventional bar arrangement inspection that takes time, and a person in charge of the bar arrangement inspection can conduct the bar arrangement inspection without moving around the site, so that the work efficiency of the entire site is improved.

According to the method described above, bar arrangement state inspection result data is obtained as three-dimensional information. In particular, by setting the inspection range to the entire site, three-dimensional bar arrangement state inspection results of the entire site are obtained as data. Such data can be used for other work and as value-added information for the building itself.

In the present embodiment, three-dimensional point cloud data and image data of the entire inspection range are only required to be acquired with a scanner whose position and direction are known and a camera whose position and direction are known, and are not limited to the above-described examples. For example, the camera may be replaced with a 360-degree camera installed so that its position and direction (posture) are to be known. Further, the scanner may be a scanner mounted on the flying device in place of a ground-mounted scanner.

Although preferred embodiments of the present invention have been described above, the embodiments described above are examples of the present invention, and these embodiments can be combined based on the knowledge of a person skilled in the art, and such combined embodiments are also included in the scope of the present invention.

REFERENCE SIGNS LIST

2: Scanner
4: Eyewear device
29: Storage unit
41: Di splay
42: Control unit
45: Relative position sensor 46: Relative direction sensor
50: Camera
60: Arithmetic processing unit (system control unit)
66: Storage unit
66A: Storage unit
71: Bar arrangement design data
100: Bar arrangement inspection system
100A: Bar arrangement inspection system
200: Bar arrangement inspection system
250: Camera
612: Bar arrangement state identification model

The invention claimed is:

1. A bar arrangement inspection system comprising:
at least one scanner configured to acquire three-dimensional point cloud data of an inspection range by transmitting scanning light and receiving reflected light in a state where coordinates and a direction of the scanner are known;
at least one camera configured to acquire image data of the inspection range in a state where coordinates and a direction of the camera are known;
at least one processor capable of transmitting and receiving information to and from the camera and the scanner; and
three-dimensional bar arrangement design data of the inspection range, wherein the processor is configured to:
receive the three-dimensional point cloud data of the inspection range acquired by the scanner and the image data of the inspection range shot by the camera, generate a point cloud composite image by combining the three-dimensional point cloud data with the image data;
identify a bar arrangement state and positions of reinforcing bars included in the point cloud composite image, and by comparing the point cloud composite image with the three-dimensional bar arrangement design data, generate three-dimensional bar arrangement state inspection result data including a bar arrangement error and position information of the bar arrangement error, and output the bar arrangement state inspection result data as output data in which the bar arrangement error is visually identifiable,
wherein the point cloud composite image includes color information that the image data has, and coordinate information of each point that the three-dimensional point cloud data includes, and
wherein a bar arrangement state and positions of reinforcing bars included in the point cloud composite image are identified by using a bar arrangement state identification model obtained as a result of learning a large number of point cloud composite images for learning created for various bar arrangement states.

2. The bar arrangement inspection system according to claim 1,
wherein the camera includes a display, a relative position sensor, and a relative direction sensor, and is equipped in an eyewear device configured to be capable of transmitting and receiving information to and from the processor, and configured so that information on positions and directions is synchronously managed in a common coordinate space with the scanner and the three-dimensional bar arrangement design data, and the bar arrangement state inspection result data is displayed on the display by being superimposed on actual objects in the inspection range.

3. The bar arrangement inspection system according to claim 1,
wherein the processor is configured to determine whether the three-dimensional bar arrangement design data conforms to standard specifications, and when the three-dimensional bar arrangement design data does not conform to the standard specifications, corrects the three-dimensional bar arrangement design data so as to conform to the standard specifications.

4. The bar arrangement inspection system according to claim 1,
wherein the scanner acquires the three-dimensional point cloud data of the inspection range, the camera acquires image data of a partial range set in the inspection range, and the processor generates a point cloud composite image by combining the three-dimensional point cloud data corresponding to the partial range with image data of the partial range.

5. The bar arrangement inspection system according to claim 1,
wherein the scanner acquires the three-dimensional point cloud data of the entire inspection range, the camera shoots an image of a region of the entire inspection range, and the processor generates the point cloud composite image by combining the three-dimensional point cloud data with the image, extracts an inspection object range from the point cloud composite image, sections the inspection object range, and inputs each section to the bar arrangement state identification model.

6. A bar arrangement inspection method comprising:
a step of acquiring three-dimensional point cloud data of an inspection range by at least one scanner configured to acquire three-dimensional point cloud data by transmitting scanning light and receiving reflected light in a state where coordinates and a direction of the scanner are known;
a step of acquiring image data of the inspection range by at least one camera in a state where coordinates and a direction of the camera are known;
a step of generating a point cloud composite image by combining the three-dimensional point cloud data of the inspection range acquired by the scanner with the image data shot by the camera by receiving the three-dimensional point cloud data and the image data of the inspection range by at least one processor and at least one memory; and
a step of generating three-dimensional bar arrangement state inspection result data including a bar arrangement error and position information of the bar arrangement error by identifying a bar arrangement state and positions of reinforcing bars included in the point cloud composite image and comparing the point cloud composite image with three-dimensional bar arrangement design data by the processor,
wherein the processor outputs the bar arrangement state inspection result data as output data in which the bar arrangement error is visually identifiable,
wherein the point cloud composite image includes color information that the image data has, and coordinate information of each point that the three-dimensional point cloud data includes, and
wherein the bar arrangement state and positions of reinforcing bars included in the point cloud composite image are identified by using a bar arrangement state identification model obtained as a result of learning a large number of point cloud composite images for learning created for various bar arrangement states.

7. A method for causing a computer including at least one processor to execute the following steps of:
> receiving three-dimensional point cloud data of an inspection range acquired by at least one scanner by transmitting scanning light and receiving reflected light in a state where coordinates and a direction of the scanner are known;
>
> receiving image data of the inspection range image data shot by at least one camera in a state where coordinates and a direction of the camera are known;
>
> generating a point cloud composite image by combining the three-dimensional point cloud data with the image data; and
>
> generating three-dimensional bar arrangement state inspection result data including a bar arrangement error and position information of the bar arrangement error by identifying a bar arrangement state and positions of reinforcing bars included in the point cloud composite image and comparing the point cloud composite image with three-dimensional bar arrangement design data by the processor, wherein
>
> the bar arrangement state and positions of reinforcing bars included in the point cloud composite image are identified by using a bar arrangement state identification model obtained as a result of learning a large number of point cloud composite images for learning created for various bar arrangement states.

8. A non-transitory computer-readable storage medium storing a program causing a computer to execute the method according to claim 7.

* * * * *